US006290913B1

(12) United States Patent
Aoyama

(10) Patent No.: US 6,290,913 B1
(45) Date of Patent: *Sep. 18, 2001

(54) APPARATUS FOR REDUCING CONCENTRATION OF CARBON MONOXIDE

(75) Inventor: Satoshi Aoyama, Susono (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/935,899

(22) Filed: Sep. 23, 1997

(30) Foreign Application Priority Data

Sep. 24, 1996 (JP) .................................. 8-274113

(51) Int. Cl.⁷ .................................... G05D 7/00
(52) U.S. Cl. .................... 422/110; 422/108; 422/109; 422/111; 422/176; 422/211; 422/220; 429/13; 429/17; 429/19; 429/22
(58) Field of Search ................. 429/13, 17, 19, 429/22; 422/128, 111, 110, 109, 108, 171, 177, 220, 211, 176; 60/274; 423/247, 246; 48/127.7; 73/863.01; 96/111; 95/8, 11, 13

(56) References Cited

U.S. PATENT DOCUMENTS

| 3,615,850 | * | 10/1971 | Lynn et al. ........................... 429/17 |
| 5,271,916 | * | 12/1993 | Vanderborgh et al. ............... 423/246 |
| 5,320,052 | * | 6/1994 | Spokoyny et al. .................... 110/345 |
| 5,518,705 | * | 5/1996 | Buswell et al. ...................... 423/437.2 |
| 5,616,430 |   | 4/1997 | Aoyama . |
| 5,637,415 | * | 6/1997 | Meltser et al. ......................... 429/17 |
| 5,658,681 | * | 8/1997 | Sato et al. ............................. 429/13 |
| 5,904,913 | * | 5/1999 | Bohm et al. ........................ 423/648.1 |

FOREIGN PATENT DOCUMENTS

| 0 650 922 A1 | * | 5/1995 | (EP) . |
| 5-201702 |   | 8/1993 | (JP) . |
| 7-185303 |   | 7/1995 | (JP) . |
| 7-196302 |   | 8/1995 | (JP) . |

* cited by examiner

Primary Examiner—Marian C. Knode
Assistant Examiner—Basia Ridley
(74) Attorney, Agent, or Firm—Oblon, Spivak, McClelland, Maier & Neustadt, P.C.

(57) ABSTRACT

The structure of the present invention consumes carbon monoxide produced by the reverse shift reaction proceeding in an effective temperature range that ensures a sufficient activity of a catalyst for selective oxidation of carbon monoxide, thus significantly reducing the concentration of carbon monoxide included in a resulting hydrogen-rich gas. A fuel reformer 30 incorporated in a fuel-cells system 10 includes a gas flow sensor 37 disposed in a reformed gas supply conduit 36 that connects a reformer unit 32 with a CO selective oxidizing unit 34. A control unit 70 outputs driving signals to three valves of the CO selective oxidizing unit 34, in response to a detection signal from the gas flow sensor 37. The CO selective oxidizing unit 34 has three reaction chambers filled with a carbon monoxide selective oxidizing catalyst. The number of the reaction chambers, which a reformed gas fed to the CO selective oxidizing unit 34 passes through, is changed by switching the on/off state of the three valves. This structure enables the amount of the carbon monoxide selective oxidizing catalyst to be regulated according to the flow rate of the reformed gas fed to the CO selective oxidizing unit 34.

12 Claims, 26 Drawing Sheets

○ CO SELECTIVE OXIDIZING CATALYST

● CO METHANIZATION CATALYST

○ CO SELECTIVE OXIDIZING CATALYST

● CO METHANIZATION CATALYST

APPARATUS FOR REDUCING CONCENTRATION OF CARBON MONOXIDE

BACKGROUND OF THE INVENTION

1. Field of the Invention

The present invention relates to an apparatus for reducing the concentration of carbon monoxide included in a carbon monoxide-containing hydrogen-rich gas and also to a method of the same.

2. Description of the Prior Art

Some proposed apparatuses for reducing the concentration of carbon monoxide use an $Au/Fe_2O_3$ catalyst supported on alumina or another support (for example, JAPANESE PATENT LAYING-OPEN GAZETTE No. 7-185303 and 7-196302). When a hydrogen-rich gas and a predetermined amount of oxygen are fed into such an apparatus, the $Au/Fe_2O_3$ catalyst accelerates the oxidation reaction of carbon monoxide preferentially over the oxidation reaction of hydrogen, thereby decreasing the concentration of carbon monoxide included in the hydrogen-rich gas.

These apparatuses for reducing the concentration of carbon monoxide are typically used in a fuel-cells system, for example, including polymer electrolyte fuel cells or phosphate fuel cells. The following shows electrochemical reactions occurring in such fuel cells:

$$H_2 \rightarrow 2H^+ + 2e^- \quad (1)$$

$$2H^+ + 2e^- + (½)O_2 \rightarrow H_2O \quad (2)$$

$$H_2 + (½)O_2 \rightarrow H_2O \quad (3)$$

Equation (1) shows the reaction occurring on the anode of the fuel cells; Equation (2) the reaction occurring on the cathode of the fuel cells; and Equation (3) the reaction occurring in the whole fuel cells. As clearly understood from these equations, for the progress of the cell reactions in the fuel cells, it is required to feed a supply of a hydrogen-containing gaseous fuel to the anode and a supply of an oxygen-containing oxidizing gas to the cathode. In case that these gases are contaminated with carbon monoxide, carbon monoxide is adsorbed by a platinum catalyst incorporated in the fuel cells and thereby lowers the catalytic function of the platinum catalyst. The air is generally used as the oxidizing gas and does not contain a significant amount of carbon monoxide that lowers the catalytic function. The gaseous fuel is, on the other hand, generally contaminated with a small amount of carbon monoxide, which may interfere with the decomposition reaction of hydrogen proceeding on the anode and deteriorate the performance of the fuel cells.

The contamination of the gaseous fuel with carbon monoxide is ascribed to the mechanism of producing the gaseous fuel through the reforming reaction of a hydrocarbon. The fuel-cells system typically includes a specific fuel reformer, which reforms a hydrocarbon to a hydrogen-rich gaseous fuel and supplies the resulting gaseous fuel to the anode of the fuel cells. The following reaction of steam reforming methanol is an example of such reforming reactions:

$$CH_3OH \rightarrow CO + 2H_2 \quad (4)$$

$$CO + H_2O \rightarrow CO_2 + H_2 \quad (5)$$

$$CH_3OH + H_2O \rightarrow CO_2 + 3H_2 \quad (6)$$

In the process of steam reforming methanol, the decomposition reaction expressed by Equation (4) proceeds simultaneously with the reforming reaction of carbon monoxide expressed by Equation (5). The reaction of Equation (6) accordingly proceeds as a whole and produces a carbon dioxide-containing hydrogen-rich gas. In case that these reactions are completely shifted to the right side, no carbon monoxide exists in the final stage. In the actual fuel reformer unit, however, it is impossible to shift the reaction of Equation (5) completely to the right side. A trace amount of carbon monoxide is thus included as a by-product in the gaseous fuel produced by the fuel reformer unit.

The carbon monoxide concentration reduction apparatus is accordingly used to reduce the concentration of carbon monoxide included in the gaseous fuel fed to the fuel cells. The following Equation (7) shows the oxidation reaction of carbon monoxide proceeding in the carbon monoxide concentration reduction apparatus. The allowable concentration of carbon monoxide in the gaseous fuel fed to the fuel cells is not greater than several percents in the case of phosphate fuel cells and not greater than several ppm in the case of polymer electrolyte fuel cells.

$$CO + (½)O_2 \rightarrow CO_2 \quad (7)$$

The $Au/Fe_2O_3$ catalyst accelerating the oxidation reaction of carbon monoxide has a narrow effective temperature range (60 to 80° C.) that ensures a sufficient catalytic activity for reducing the concentration of carbon monoxide. At the temperatures lower than the effective temperature range, the low oxidation activity of the catalyst does not sufficiently accelerate the oxidation reaction of carbon monoxide, which results in insufficient reduction of the concentration of carbon monoxide. At the temperatures higher than the effective temperature range, on the other hand, a small amount of carbon monoxide existing in the gaseous fuel is not selectively oxidized. Under this condition, affluent hydrogen is oxidized, and the oxidation reaction of carbon monoxide is not sufficiently carried out.

In order to reduce the concentration of carbon monoxide sufficiently, a precise regulation of the inner temperature of the carbon monoxide concentration reduction apparatus to the above effective temperature range is required according to the flow rate of the reformed gas that is subjected to the selective oxidation reaction of carbon monoxide. Rare metals, such as platinum, palladium, and rhodium, other than the $Au/Fe_2O_3$ catalyst are known as the CO selective oxidizing catalyst. These rare metals have wider effective temperature ranges than that of the $Au/Fe_2O_3$ catalyst. In case that the fuel cells receiving a supply of the reformed gas containing a reduced concentration of carbon monoxide are used as a power source for driving a vehicle, the amount of the reformed gas to be processed by the carbon monoxide concentration reduction apparatus remarkably varies with a significant variation in loading. The catalyst having the wider effective temperature range that ensures a high catalytic activity for selective oxidation reaction of carbon monoxide facilitates the regulation of the inner temperature of the carbon monoxide concentration reduction apparatus to the effective temperature range.

In some cases, however, the concentration of carbon monoxide is not sufficiently reduced, even when the inner temperature of the carbon monoxide concentration reduction apparatus is kept within the effective temperature range. This is because the catalyst for accelerating the oxidation reaction of carbon monoxide also has an activity for accelerating the production of carbon monoxide. In the carbon monoxide concentration reduction apparatus, the reforming reaction of carbon monoxide expressed by Equation (5) (hereinafter referred to as the shift reaction) and a reverse reaction of Equation (5) (hereinafter referred to as the reverse shift reaction) proceed in addition to the oxidation reaction of carbon monoxide expressed by Equation (7). The reverse shift reaction produces carbon monoxide. The following Equation (8) shows the reverse shift reaction, that is, a reverse of the reforming reaction of carbon monoxide expressed by Equation (5). The shift reaction of Equation (5) is exothermic, whereas the reverse shift reaction of Equation (8) is endothermic.

$$H_2 + CO_2 \rightarrow H_2O + CO \qquad (8)$$

The reactions of Equations (5) and (8) are reversible. A variation in concentration of any one of the reactants and products or a variation in surrounding temperature shifts the equilibrium, and accelerates either the shift reaction of Equation (5) or the reverse shift reaction of Equation (8). In the effective temperature range that ensures a sufficient activity of the CO selective oxidizing catalyst for selective oxidation of carbon monoxide (for example, 100 to 160° C. in the case of the platinum catalyst), the endothermic reverse shift reaction of Equation (8) proceeds to produce carbon monoxide.

When the oxidation reaction of carbon monoxide expressed by Equation (7) sufficiently proceeds, the degree of the reverse shift reaction expressed by Equation (8) is significantly smaller than the degree of the oxidation reaction of carbon monoxide expressed by Equation (7). Under such conditions, the concentration of carbon monoxide in the reformed gas is sufficiently reduced. In case that the oxidation reaction of carbon monoxide is concluded before the reformed gas fed to the carbon monoxide concentration reduction apparatus has passed through the surface of the CO selective oxidizing catalyst, however, only the reverse shift reaction of Equation (8) proceeds between the position of the conclusion of the oxidation reaction and the position of the discharge of the reformed gas. When it is required to reduce the concentration of carbon monoxide to the ppm level, the amount of carbon monoxide produced by the reverse shift reaction is negligible. The amount of oxygen introduced into the reformed gas for the oxidation reaction of carbon monoxide is generally determined according to the flow rate of the reformed gas fed to the carbon monoxide concentration reduction apparatus. Oxygen is accordingly used up at the time point when the oxidation reaction of carbon monoxide is concluded. The oxidation reaction of Equation (7) can thus not proceed to consume carbon monoxide produced by the reverse shift reaction proceeding after the conclusion of the oxidation reaction of carbon monoxide. The reformed gas containing carbon monoxide produced by the reverse shift reaction is according fed from the carbon monoxide concentration reduction apparatus to the fuel cells.

As discussed above, even when the inner temperature of the carbon monoxide concentration reduction apparatus is kept within the effective temperature range that ensures a high catalytic activity for selective oxidation of carbon monoxide, the conventional carbon monoxide concentration reduction apparatus may not sufficiently reduce the concentration of carbon monoxide due to carbon monoxide produced by the reverse shift reaction. Especially in case that a significant variation in loading connected to the fuel cells varies the amount of the reformed gas to be processed by the carbon monoxide concentration reduction apparatus, a change in space velocity in the apparatus worsens the problem of the reverse shift reaction. The space velocity represents a volume of the supplied gas per unit volume of the catalyst and unit hour and shown by the unit of $h^{-1}$. The decrease in amount of the reformed gas to be processed by the carbon monoxide concentration reduction apparatus with a decrease in loading lowers the space velocity and causes the amount of the catalyst to be excess over the amount of the reformed gas subjected to the selective oxidation reaction of carbon monoxide. This quickly concludes the oxidation reaction of carbon monoxide and increases the amount of carbon monoxide produced by the reverse shift reaction. When an increase in loading enhances the space velocity in the carbon monoxide concentration reduction apparatus, on the other hand, the supply of the reformed gas is made excess over the processing ability of the catalyst. This results in insufficient selective oxidation of carbon monoxide and causes the reformed gas containing the non-oxidized residual carbon monoxide to be fed from the carbon monoxide concentration reduction apparatus to the fuel cells.

SUMMARY OF THE INVENTION

The object of the present invention is thus to consume carbon monoxide produced by the reverse shift reaction proceeding in an effective temperature range that ensures a sufficient activity of a catalyst for selective oxidation of carbon monoxide and thereby significantly reduce the concentration of carbon monoxide included in a resulting hydrogen-rich gas.

At least part of the above and the other related objects is realized by a first apparatus for reducing concentration of carbon monoxide included in a carbon monoxide-containing hydrogen-rich gas, which includes: a carbon monoxide selective oxidation reaction unit including a predetermined amount of a carbon monoxide selective oxidizing catalyst for accelerating a selective oxidation reaction of carbon monoxide; oxidizing gas introduction means for introducing an oxidizing gas containing oxygen for oxidizing carbon monoxide, into the carbon monoxide selective oxidation reaction unit; gas supply means for feeding the hydrogen-rich gas containing carbon monoxide into the carbon monoxide selective oxidation reaction unit; and catalyst amount control means for regulating an amount of the carbon monoxide selective oxidizing catalyst actually involved in the selective oxidation reaction of carbon monoxide among a total amount of the carbon monoxide selective oxidizing catalyst, based on an amount of carbon monoxide included in the hydrogen-rich gas.

In the first carbon monoxide concentration reduction apparatus of the present invention, the amount of the carbon monoxide selective oxidizing catalyst involved in the selective oxidation reaction of carbon monoxide in the hydrogen-rich gas is regulated to be suitable for the amount of carbon monoxide existing in the hydrogen-rich gas. This structure adequately regulates the space velocity of the hydrogen-rich gas into the carbon monoxide selective oxidation reaction unit, so as to sufficiently reduce the concentration of carbon monoxide in the hydrogen-rich gas. Unlike the conventional structure, the adequate space velocity effectively prevents the selective oxidation reaction of carbon monoxide from being quickly concluded in the carbon monoxide selective oxidation reaction unit and thus depresses the reverse shift reaction that increases the concentration of carbon monoxide in the hydrogen-rich gas. The adequate space velocity also ensures the sufficient selective oxidation reaction of carbon monoxide in the carbon monoxide selective oxidation reaction unit, thereby preventing a significant amount of carbon monoxide from not being oxidized but remaining in the hydrogen-rich gas.

In the first carbon monoxide concentration reduction apparatus, the oxidizing gas introduced into the carbon monoxide selective oxidation reaction unit by the oxidizing gas introduction means may be mixed in advance with the hydrogen-rich gas.

In the first carbon monoxide concentration reduction apparatus of the present invention, it is preferable that the carbon monoxide selective oxidation reaction unit includes a plurality of carbon monoxide selective oxidizing units that respectively include the carbon monoxide selective oxidizing catalyst and have an inlet, into which the hydrogen-rich gas mixed with the oxidizing gas flows, and an outlet, from which the hydrogen-rich gas containing a reduced concentration of carbon monoxide is discharged. In this structure, the catalyst amount control means controls an open/close state of at least either one of the inlet and the outlet of each carbon monoxide selective oxidizing unit, so as to enable the selective oxidation reaction of carbon monoxide to proceed in a predetermined number of the carbon monoxide selective oxidizing units corresponding to the amount of carbon monoxide included in the hydrogen-rich gas.

This structure simply controls the open/close state of at least either one of the inlet and the outlet of each carbon monoxide selective oxidizing unit, in order to regulate the amount of the catalyst.

In the first carbon monoxide concentration reduction apparatus of the present invention, it is also preferable that the carbon monoxide selective oxidation reaction unit includes a plurality of gas discharge openings arranged in a flow direction of the hydrogen-rich gas for discharging the hydrogen-rich gas containing a reduced concentration of carbon monoxide. In this structure, the catalyst amount control means selects one gas discharge opening, from which the hydrogen rich gas containing the reduced concentration of carbon monoxide is actually discharged, among the plurality of gas discharge openings, so as to vary an area of the carbon monoxide selective oxidizing catalyst involved in the selective oxidation reaction of carbon monoxide in the carbon monoxide selective oxidation reaction unit.

In this structure, the amount of the catalyst is readily controlled by simply selecting a suitable gas discharge opening.

The present invention is also directed to a second apparatus for reducing concentration of carbon monoxide included in a carbon monoxide-containing hydrogen-rich gas, which includes: a carbon monoxide selective oxidation reaction unit including a carbon monoxide selective oxidizing catalyst that accelerates a selective oxidation reaction of carbon monoxide depending upon a temperature; oxidizing gas introduction means for introducing an oxidizing gas containing oxygen for oxidizing carbon monoxide, into the carbon monoxide selective oxidation reaction unit; gas supply means for feeding the hydrogen-rich gas containing carbon monoxide into the carbon monoxide selective oxidation reaction unit; and catalyst activity control means for regulating a temperature of the carbon monoxide selective oxidizing catalyst, in order to enable the selective oxidation reaction of carbon monoxide proceeding in the carbon monoxide selective oxidation reaction unit to be concluded in the vicinity of an outlet of the carbon monoxide selective oxidation reaction unit, from which the hydrogen-rich gas containing a reduced concentration of carbon monoxide is discharged.

In the second carbon monoxide concentration reduction apparatus of the present invention, the selective oxidation reaction of carbon monoxide proceeding in the carbon monoxide selective oxidation reaction unit is made to conclude in the vicinity of the outlet of the carbon monoxide selective oxidation reaction unit. This structure effectively prevents the selective oxidation reaction of carbon monoxide from being quickly concluded and thus depresses the reverse shift reaction that increases the concentration of carbon monoxide in the hydrogen-rich gas. This structure also ensures the sufficient selective oxidation reaction of carbon monoxide, thereby preventing a significant amount of carbon monoxide from not being oxidized but remaining in the hydrogen-rich gas.

In the second carbon monoxide concentration reduction apparatus of the present invention, it is preferable that the catalyst activity control means includes: oxidation temperature estimation means for estimating an optimum temperature of the carbon monoxide selective oxidizing catalyst that enables the selective oxidation reaction of carbon monoxide proceeding in the carbon monoxide selective oxidation reaction unit to be concluded at the outlet of the carbon monoxide selective oxidation reaction unit, based on an amount of carbon monoxide included in the hydrogen-rich gas; and catalyst temperature control means for varying the temperature of the carbon monoxide selective oxidizing catalyst, in order to make the temperature of the carbon monoxide selective oxidizing catalyst approach the optimum temperature estimated by the oxidation temperature estimation means.

Even when the amount of carbon monoxide included in the hydrogen-rich gas is varied significantly, the temperature of the carbon monoxide selective oxidizing catalyst is regulated according to the varied amount of carbon monoxide. This structure enables the selective oxidation reaction of carbon monoxide to be concluded at the time point when the hydrogen-rich gas has just passed through the surface of the carbon monoxide selective oxidizing catalyst.

In the second carbon monoxide concentration reduction apparatus of the present invention, it is also preferable that the catalyst activity control means includes: a plurality of carbon monoxide sensors arranged in a flow direction of the hydrogen-rich gas in the carbon monoxide selective oxidation reaction unit; and catalyst temperature control means for varying the temperature of the carbon monoxide selective oxidizing catalyst, based on a variation in concentration of carbon monoxide included in the hydrogen-rich gas in the carbon monoxide selective oxidation reaction unit, which is detected by the plurality of carbon monoxide sensors.

In case that the concentration of carbon monoxide in the hydrogen-rich gas discharged from the carbon monoxide selective oxidation reaction unit is not sufficiently reduced, this structure readily ascribes the insufficient reduction either to the insufficient selective oxidation reaction of carbon monoxide or to the excess progress of the reverse shift reaction. This accordingly ensures appropriate temperature control of the carbon monoxide selective oxidizing catalyst.

The present invention is further directed to a third apparatus for reducing concentration of carbon monoxide included in a carbon monoxide-containing hydrogen-rich gas, which includes: a carbon monoxide selective oxidation reaction unit including a carbon monoxide selective oxidizing catalyst for accelerating a selective oxidation reaction of carbon monoxide; oxidizing gas introduction means for introducing an oxidizing gas containing oxygen for oxidizing carbon monoxide, into the carbon monoxide selective oxidation reaction unit; gas supply means for feeding the hydrogen-rich gas containing carbon monoxide into the carbon monoxide selective oxidation reaction unit; and a methanization reaction unit including a methanization catalyst for accelerating a methanization reaction of carbon monoxide, the methanization reaction unit receiving a supply of the hydrogen rich gas containing a reduced concentration of carbon monoxide fed from the carbon monoxide selective oxidation reaction unit and further reducing the concentration of carbon monoxide in the hydrogen-rich gas through the methanization reaction.

In the third carbon monoxide concentration reduction apparatus of the present invention, even when the carbon monoxide selective oxidation reaction unit does not sufficiently reduce the concentration of carbon monoxide, the methanization reaction unit methanizes the non-oxidized residual carbon monoxide, thereby sufficiently reducing the concentration of carbon monoxide in the hydrogen-rich gas.

The present invention is also directed to a fourth apparatus for reducing concentration of carbon monoxide included in a carbon monoxide-containing hydrogen-rich gas, which includes: a carbon monoxide selective oxidation reaction unit including a carbon monoxide selective oxidizing catalyst for accelerating a selective oxidation reaction of carbon monoxide; oxidizing gas introduction means for introducing an oxidizing gas containing oxygen for oxidizing carbon monoxide, into the carbon monoxide selective oxidation reaction unit; and gas supply means for feeding the hydrogen-rich gas containing carbon monoxide into the carbon monoxide selective oxidation reaction unit. The carbon monoxide selective oxidation reaction unit further includes a methanization catalyst for accelerating a methanization reaction of carbon monoxide, in order to reduce the concentration of carbon monoxide in the hydrogen-rich gas through the selective oxidation reaction of carbon monoxide as well as the methanization reaction.

In the fourth carbon monoxide concentration reduction apparatus of the present invention, the methanization reaction as well as the selective oxidation reaction of carbon monoxide reduces the concentration of carbon monoxide included in the hydrogen-rich gas. Even when the selective oxidation reaction of carbon monoxide is concluded quickly and the reverse shift reaction proceeds to produce carbon monoxide in the carbon monoxide selective oxidation reaction unit, the methanization reaction methanizes carbon monoxide newly produced, so that the resulting hydrogen-rich gas has an extremely low concentration of carbon monoxide. One catalyst included in the carbon monoxide selective oxidation reaction unit may have both the activities for selective oxidation and methanization of carbon monoxide. Alternatively different catalysts may have the respective activities.

The present invention is further directed to a fifth apparatus for reducing concentration of carbon monoxide included in a carbon monoxide-containing hydrogen-rich gas, which includes: a carbon monoxide selective oxidation reaction unit including a carbon monoxide selective oxidizing catalyst for accelerating a selective oxidation reaction of carbon monoxide; oxidizing gas introduction means for introducing a predetermined amount of an oxidizing gas containing oxygen for oxidizing carbon monoxide, into the carbon monoxide selective oxidation reaction unit, the predetermined amount depending upon a flow rate of the hydrogen-rich gas; and gas supply means for feeding the hydrogen-rich gas containing carbon monoxide into the carbon monoxide selective oxidation reaction unit. The oxidizing gas introduction means includes: oxidizing gas amount calculation means for calculating a required amount of the oxidizing gas for oxidizing carbon monoxide secondarily produced in the carbon monoxide selective oxidation reaction unit in addition to carbon monoxide originally included in the hydrogen-rich gas, based on a temperature of the carbon monoxide selective oxidizing catalyst and a space velocity of the hydrogen-rich gas in the carbon monoxide selective oxidation reaction unit; and oxidizing gas supply determination means for determining a supply of the oxidizing gas introduced into the carbon monoxide selective oxidation reaction unit, based on the required amount of the oxidizing gas calculated by the oxidizing gas supply calculation means.

Even when a decrease in supply of the hydrogen-rich gas lowers the space velocity in the carbon monoxide selective oxidation reaction unit, the fifth carbon monoxide concentration reduction apparatus of the present invention eeffectively prevents the concentration of carbon monoxide from increasing due to the reverse shift reaction, thus sufficiently reducing the concentration of carbon monoxide in the hydrogen-rich gas.

Part of the objects of the present invention is also realized by a first method of reducing concentration of carbon monoxide included in a carbon monoxide-containing hydrogenrich gas. The first method includes the steps of:

(a) mixing an oxidizing gas containing oxygen for oxidizing carbon monoxide with the hydrogen-rich gas; and (b) utilizing a carbon monoxide selective oxidizing catalyst for accelerating a selective oxidation reaction of carbon monoxide, thereby reducing the concentration of carbon monoxide in the hydrogen-rich gas mixed with the oxidizing gas through the selective oxidation reaction of carbon monoxide, the step (b) further including the step of:

(b-1) regulating an amount of the carbon monoxide selective oxidizing catalyst actually involved in the selective oxidation reaction of carbon monoxide, based on an amount of carbon monoxide in the hydrogen-rich gas.

The first method of the present invention adequately regulates the space velocity of the hydrogen-rich gas, so as to sufficiently reduce the concentration of carbon monoxide in the hydrogen-rich gas. Unlike the conventional method, the adequate space velocity effectively prevents the selective oxidation reaction of carbon monoxide from being quickly concluded and thus depresses the reverse shift reaction that increases the concentration of carbon monoxide in the hydrogen-rich gas. The adequate space velocity also ensures the sufficient selective oxidation reaction of carbon monoxide, thereby preventing a significant amount of carbon monoxide from not being oxidized but remaining in the hydrogen-rich gas.

The present invention is also directed to a second method of reducing concentration of carbon monoxide included in a carbon monoxide-containing hydrogen-rich gas. The second method includes the steps of:

(c) mixing an oxidizing gas containing oxygen for oxidizing carbon monoxide with the hydrogen-rich gas; and (d) utilizing a carbon monoxide selective oxidizing catalyst that accelerates a selective oxidation reaction of carbon monoxide depending upon a temperature, thereby reducing the concentration of carbon monoxide in the hydrogen-rich gas mixed with the oxidizing gas through the selective oxidation reaction of carbon monoxide proceeding on a surface of the carbon monoxide selective oxidizing catalyst, the step (d) further including the step of:
- (d-1) regulating a temperature of the carbon monoxide selective oxidizing catalyst, in order to enable the selective oxidation reaction of carbon monoxide to be concluded at a time point when the hydrogen-rich gas has just passed through the carbon monoxide selective oxidizing catalyst.

The second method of the present invention effectively prevents the selective oxidation reaction of carbon monoxide from being quickly concluded and thus depresses the reverse shift reaction that increases the concentration of carbon monoxide in the hydrogen-rich gas. The second method also ensures the sufficient selective oxidation reaction of carbon monoxide, thereby preventing a significant amount of carbon monoxide from not being oxidized but remaining in the hydrogen-rich gas.

The present invention is further directed to a third method of reducing concentration of carbon monoxide included in a carbon monoxide-containing hydrogen-rich gas. The third method includes the steps of:
- (e) mixing an oxidizing gas containing oxygen for oxidizing carbon monoxide with the hydrogen-rich gas;
- (f) utilizing a carbon monoxide selective oxidizing catalyst for accelerating a selective oxidation reaction of carbon monoxide, thereby reducing the concentration of carbon monoxide in the hydrogen-rich gas mixed with the oxidizing gas through the selective oxidation reaction of carbon monoxide; and
- (g) utilizing a methanization catalyst for accelerating a methanization reaction of carbon monoxide, thereby further reducing the concentration of carbon monoxide included in the hydrogen-rich gas through the methanization reaction, after the reduction of the concentration of carbon monoxide through the selective oxidation reaction of carbon monoxide.

In the third method of the present invention, even when the selective oxidation reaction of carbon monoxide does not sufficiently reduce the concentration of carbon monoxide, the methanization reaction methanizes the non-oxidized residual carbon monoxide, thereby sufficiently reducing the concentration of carbon monoxide in the hydrogen-rich gas.

The present invention is further directed to a fourth method of reducing concentration of carbon monoxide included in a carbon monoxide-containing hydrogen-rich gas. The fourth method includes the steps of:
- (h) mixing an oxidizing gas containing oxygen for oxidizing carbon monoxide with the hydrogen-rich gas; and
- (i) utilizing a mixture of a carbon monoxide selective oxidizing catalyst for accelerating a selective oxidation reaction of carbon monoxide and a methanization catalyst for accelerating a methanization reaction of carbon monoxide, thereby reducing the concentration of carbon monoxide in the hydrogen-rich gas mixed with the oxidizing gas through the selective oxidation reaction of carbon monoxide and the methanization reaction.

In the fourth method of the present invention, the methanization reaction as well as the selective oxidation reaction of carbon monoxide reduces the concentration of carbon monoxide included in the hydrogen-rich gas. Even when the selective oxidation reaction of carbon monoxide is concluded quickly and the reverse shift reaction proceeds to produce carbon monoxide, the methanization reaction methanizes carbon monoxide newly produced, so that the resulting hydrogen-rich gas has an extremely low concentration of carbon monoxide.

The present invention is further directed to a fifth method of reducing concentration of carbon monoxide included in a carbon monoxide-containing hydrogen-rich gas. The fifth method includes the steps of:
- (j) mixing a predetermined amount of an oxidizing gas containing oxygen for oxidizing carbon monoxide with the hydrogen-rich gas, the predetermined amount depending upon a flow rate of the hydrogen-rich gas; and
- (k) utilizing a carbon monoxide selective oxidizing catalyst for accelerating a selective oxidation reaction of carbon monoxide, thereby reducing the concentration of carbon monoxide in the hydrogen-rich gas mixed with the oxidizing gas through the selective oxidation reaction of carbon monoxide;

the step (k) further including the steps of:
- (k-1) calculating a required amount of the oxidizing gas for oxidizing carbon monoxide secondarily produced in the presence of the carbon monoxide selective oxidizing catalyst in addition to carbon monoxide originally included in the hydrogen-rich gas, based on a temperature of the carbon monoxide selective oxidizing catalyst and a space velocity of the hydrogen-rich gas for a progress of the selective oxidation reaction of carbon monoxide; and
- (k-2) determining a supply of the oxidizing gas to be mixed with the hydrogen-rich gas, based on the required amount of the oxidizing gas calculated in the step (k-1).

Even when a decrease in supply of the hydrogen-rich gas lowers the space velocity, the fifth method of the present invention effectively prevents the concentration of carbon monoxide from increasing due to the reverse shift reaction, thus sufficiently reducing the concentration of carbon monoxide in the hydrogen-rich gas.

Another possible application of the present invention is a fuel-cells system that includes fuel cells for receiving supplies of a hydrogen-containing gaseous fuel and an oxygen-containing oxidizing gas and generating an electromotive force, and a fuel supply unit for feeding the gaseous fuel to the fuel cells. The fuel supply unit includes a fuel reformer for reforming a predetermined hydrocarbon to a carbon monoxide-containing hydrogen-rich gas, and any one of the carbon monoxide concentration reduction apparatuses of the present invention for receiving a supply of the hydrogen-rich gas from the fuel reformer and discharging the gaseous fuel containing a reduced concentration of carbon monoxide.

Even when the amounts processed by the fuel reformer and the carbon monoxide concentration reduction apparatus are varied with a variation in loading connected to the fuel cells, the structure of the fuel-cells system enables the gaseous fuel containing a sufficiently reduced amount of carbon monoxide to be fed to the fuel cells.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
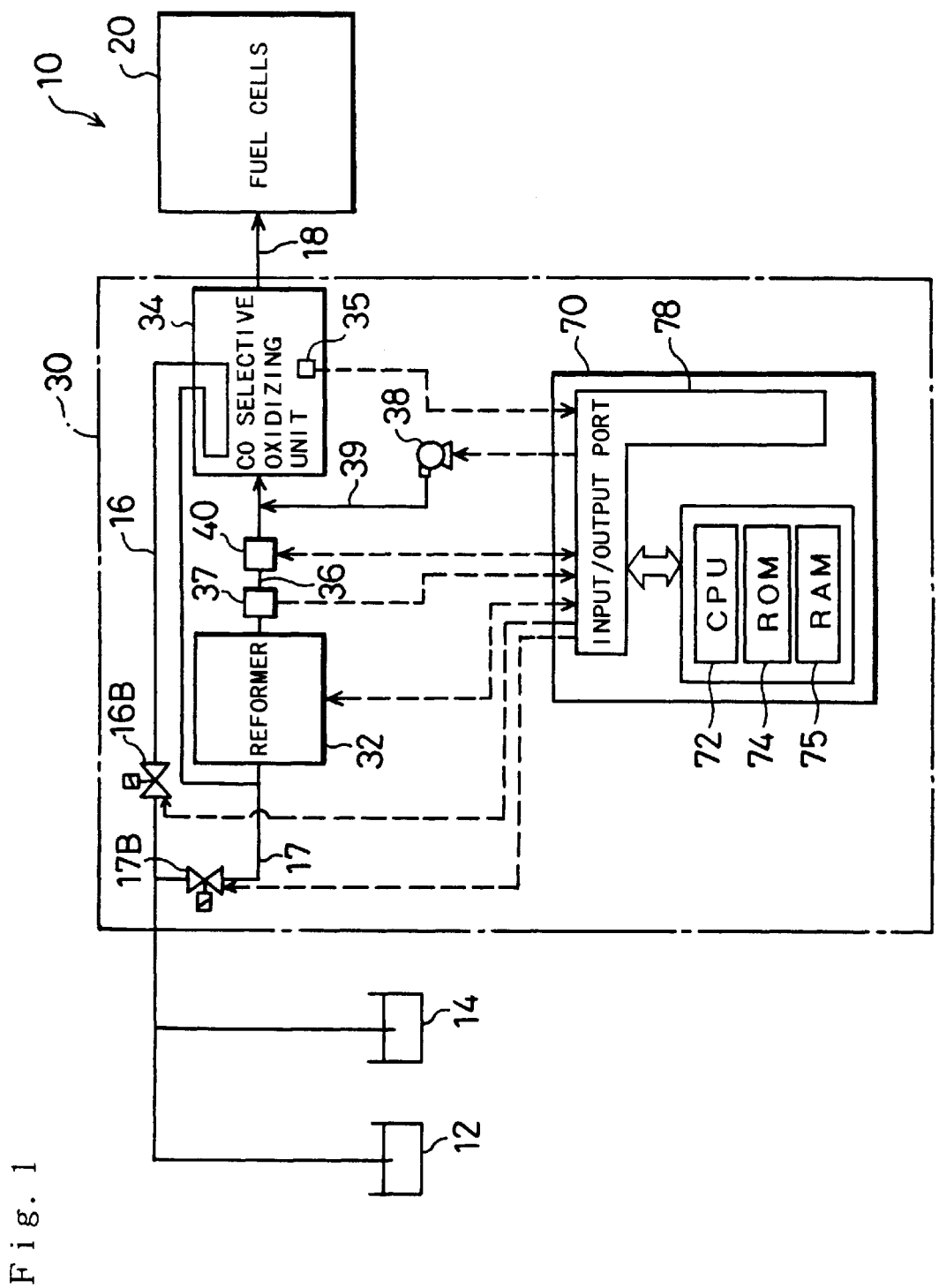
FIG. 1 is a block diagram illustrating structure of a fuel-cells system 10 as a first embodiment according to the present invention.

Some modes of carrying out the present invention are discussed below as preferred embodiments. FIG. 1 is a block diagram illustrating structure of a fuel-cells system 10 as a first embodiment according to the present invention. As shown in FIG. 1, the fuel-cells system 10 includes a methanol tank 12, a water tank 14, a fuel reformer 30, and fuel cells 20 as primary constituents.

The methanol tank 12 stores methanol and the water tank 14 stores water. Supplies of methanol and water are fed to the fuel reformer 30 via a crude fuel supply conduit 17. The fuel reformer 30 converts the supplies of methanol and water to a gaseous fuel containing hydrogen. The fuel cells 20 receive supplies of the gaseous fuel produced by the fuel reformer 30 and an oxygen-containing oxidizing gas and generate an electromotive force through electrochemical reactions.

Figure 2:
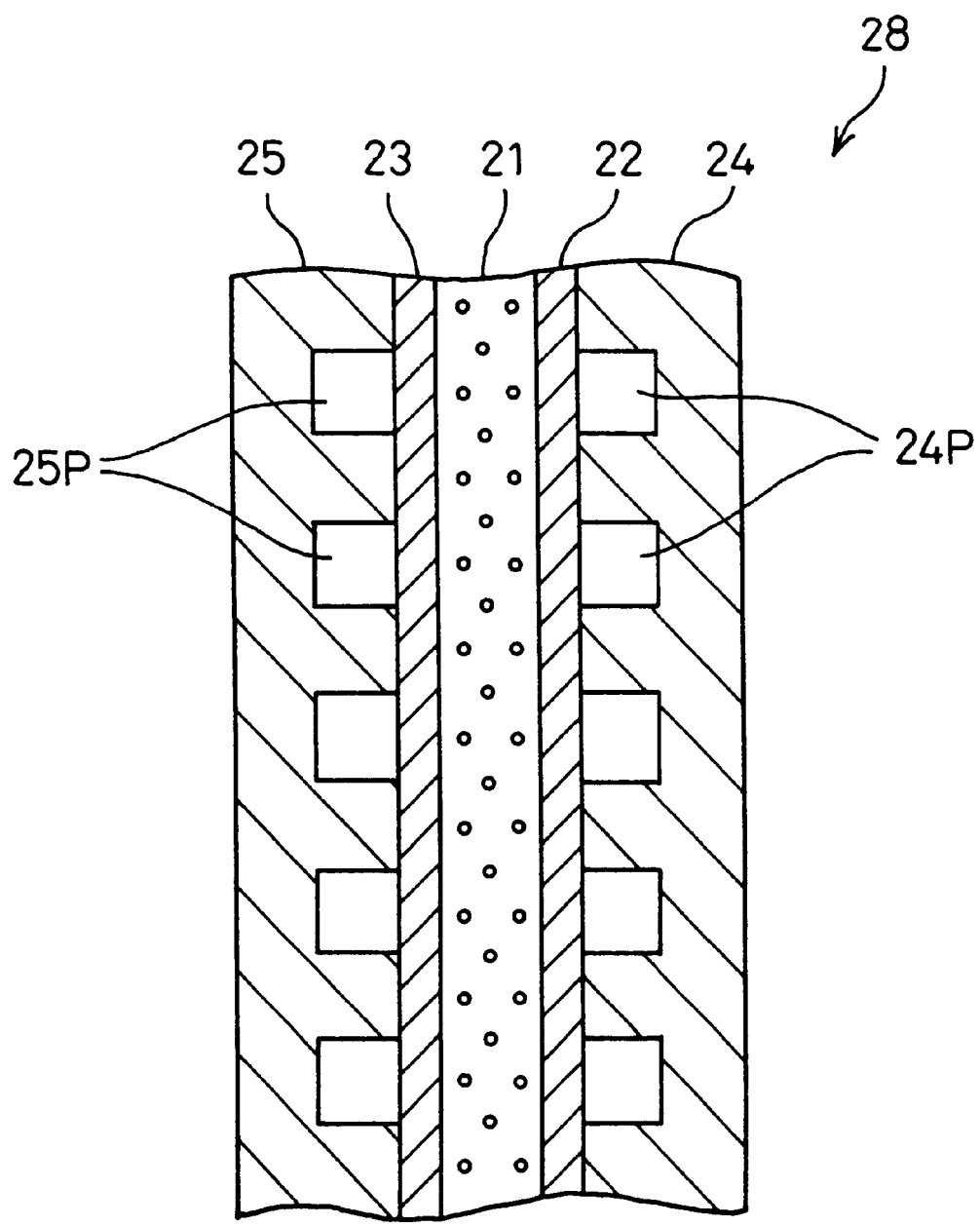
FIG. 2 is a cross sectional view schematically illustrating structure of a unit cell 28 in a stack of fuel cells 20.

The fuel cells 20 are polymer electrolyte fuel cells and constructed as a stack of plural unit cells 28. FIG. 2 is a cross sectional view schematically illustrating structure of each unit cell 28 in the stack of fuel cells 20. The unit cell 28 includes an electrolyte membrane 21, an anode 22, a cathode 23, and separators 24 and 25.

The anode 22 and the cathode 23 are gas diffusion electrodes arranged across the electrolyte membrane 21 to construct a sandwich-like structure. The separators 24 and 25 are disposed outside the sandwich-like structure and respectively connected to the anode 22 and the cathode 23 to form flow paths of gaseous fuel and oxidizing gas. Flow paths 24P of gaseous fuel are defined by the anode 22 and the separator 24, whereas flow paths 25P of oxidizing gas are defined by the cathode 23 and the separator 25.

The electrolyte membrane 21 is a proton-conductive ion-exchange membrane composed of a polymer material, such as fluororesin, and shows favorable electrical conductivity in the wet state. In this embodiment, a Nafion membrane (manufactured by du Pont) is applied for the electrolyte membrane 21. The surface of the electrolyte membrane 21 is coated with platinum or a platinum-containing alloy functioning as a catalyst. The technique adopted in this embodiment to apply the catalyst prepares carbon powder with platinum or a platinum-containing alloy supported thereon, disperses the catalyst-supported carbon powder into an appropriate organic solvent, adds a specific amount of an electrolyte solution (for example, Nafion solution manufactured by Aldrich Chemical Corp.) to the dispersion to form a paste, and screen-prints the paste on the electrolyte membrane 21. Another available technique forms the paste containing the catalyst-supported carbon powder to a sheet and presses the sheet onto the electrolyte membrane 21.

The anode 22 and the cathode 23 are made of carbon cloth, which is woven of yarns consisting of carbon fibers. Although the anode 22 and the cathode 23 are composed of carbon cloth in this embodiment, carbon paper or carbon felt consisting of carbon fibers are also favorably applicable for the material of the anode 22 and the cathode 23.

The separators 24 and 25 are made of a gas-impermeable conductive material, for example, gas-impermeable, dense carbon obtained by compressing carbon. Each of the separators 24 and 25 has a plurality of ribs formed in a predetermined shape on the surface thereof. As discussed previously, the separator 24 is combined with the surface of the anode 22 to define the flow paths 24P of gaseous fuel, whereas the separator 25 is combined with the surface of the cathode 23 to define the flow paths 25P of oxidizing gas. The ribs formed on the surface of each separator may have any shape that allows formation of gas flow paths and supply of the gaseous fuel or the oxidizing gas to the corresponding gas diffusion electrode. In this embodiment, the ribs are a plurality of grooves formed in parallel. Although the separators 24 and 25 are regarded as different elements in the above discussion, each separator has ribs formed on both surfaces thereof and is interposed between adjoining unit cells 28 in the actual stack of fuel cells 20.

As discussed above, each unit cell 28, which is the fundamental structure of the fuel cells 20, has the anode 22, the electrolyte membrane 21, and the cathode 23 that are interposed between separators. The stack of fuel cells 20 is obtained by stacking plural sets of such unit cells 28 (100 sets in this embodiment) and setting current collector plates (not shown), which are made of dense carbon or copper plates, on both ends of the stack structure.

Although only the supply system of the gaseous fuel fed to the anode of the fuel cells 20 is illustrated in FIG. 1, an oxidizing gas supply unit (not shown) for feeding the pressurized air is connected to the cathode. The stack of fuel cells 20 is also connected with a fuel gas discharge unit and an oxidizing gas discharge unit (not shown) that respectively discharge the exhausts of fuel gas and oxidizing gas, which have been subjected to the electrochemical reactions on the respective electrodes, out of the fuel cells 20.

Referring back to FIG. 1, the fuel reformer 30 includes a reformer unit 32, a CO selective oxidizing unit 34, a gas flow sensor 37, a carbon monoxide sensor 40, a blower 38, and a control unit 70 as primary constituents. The reformer unit 32 receives supplies of methanol and water and produces a hydrogen-rich reformed gas. The CO selective oxidizing unit 34 oxidizes carbon monoxide included in the reformed gas and decreases the concentration of carbon monoxide in the reformed gas, so as to produce a gaseous fuel containing carbon monoxide of not greater than a predetermined level. The gas flow sensor 37 and the carbon monoxide sensor 40 are disposed in the middle of a reformed gas supply conduit 36 that feeds the reformed gas produced by the reformer unit 32 to the CO selective oxidizing unit 34, and respectively measure the flow rate of the reformed gas and the concentration of carbon monoxide included in the reformed gas. The blower 38 feeds an oxygen-containing oxidizing gas (the air in this embodiment) to the reformed gas supply conduit 36 via an induction pipe 39, which is connected to the reformed gas supply conduit 36 and arranged after the gas flow sensor 37 and the carbon monoxide sensor 40. The control unit 70 controls the operations of the respective constituents of the fuel reformer 30. The respective constituents of the fuel reformer 30 are discussed in detail below.

The reformer unit 32 receives supplies of methanol and water from the methanol tank 12 and the water tank 14 and produces a reformed gas containing hydrogen and carbon dioxide through the reactions expressed by Equations (4) and (5) discussed previously. The crude fuel supply conduit 17 for feeding the supplies of methanol and water to the reformer unit 32 branches off at a predetermined position to a first branch path 16. The first branch path 16 goes into the CO selective oxidizing unit 34, in order to enable a crude fuel consisting of methanol and water to circulate through a circumferential portion of the CO selective oxidizing unit 34. The first branch path 16 going through the CO selective oxidizing unit 34 again joins with the crude fuel supply conduit 17 at a downstream site. As discussed later, the CO selective oxidizing unit 34 is heated to a predetermined high temperature. This configuration accordingly increases the temperatures of methanol and water prior to the supply to the reformer unit 32. The crude fuel supply conduit 17 and the first branch path 16 are respectively provided with valves 17B and 16B, which are connected to the control unit 70. The control unit 70 outputs driving signals to these valves 17B and 16B and controls the positions thereof, thus regulating the flow rates of the crude fuel passing through the respective flow paths.

As discussed above, the reforming reaction of carbon monoxide expressed as Equation (5) is not completely shifted to the right side, so that the reformed gas produced by the reformer unit 32 contains a small amount of carbon monoxide as a by-product. The concentration of carbon monoxide included in the reformed gas depends upon the type of the catalyst packed in the reformer unit 32, the operating temperature of the reformer unit 32, and the flow rates (space velocities) of methanol and water fed to the reformer unit 32 per unit volume of the catalyst. In this embodiment, a Cu—Zn catalyst is packed in the reformer unit 32.

The Cu—Zn catalyst is made of metal oxides prepared by coprecipitation and formed to tablets of ⅛ inch in diameter. The reformer unit 32 is filled with the Cu—Zn catalyst. Methanol and water fed to the reformer unit 32 via the crude fuel supply conduit 17 are heated and vaporized by an evaporator (not shown) arranged before the reformer unit 32 and introduced into the reformer unit 32. As discussed above, in this embodiment, methanol and water supplied via the crude fuel supply conduit 17 pass through the CO selective oxidizing unit 34 to be heated therein. This configuration effectively reduces the amount of heat required for vaporizing methanol and water in the evaporator. A vapor mixture of methanol and water is then led into the reformer unit 32 and brought into contact with the reforming catalyst. The reforming reactions accordingly proceed on the surface of the reforming catalyst. With the progress of the reforming reactions, hydrogen and carbon dioxide are produced, and a hydrogen-rich reformed gas is output to the reformed gas supply conduit 36.

The reforming reactions carried out in the reformer unit 32 are endothermic as a whole (reaction expressed by Equation (6)), and the reformer unit 32 has a combustion unit (not shown) for obtaining heat required for the reactions. The combustion unit receives a supply of methanol from the methanol tank 12 and a supply of the fuel gas exhaust discharged after the cell reactions in the fuel cells 20 as the fuel for combustion. Regulation of the supplies of methanol and fuel gas exhaust fed to the combustion unit controls the operating temperature of the reformer unit 32 in a range of 220° C. to 300° C. The reformer unit 32 is connected to the control unit 70 via a predetermined conductive line. The control unit 70 regulates the supplies of methanol and fuel gas exhaust fed to the combustion unit and supplies of methanol and water fed to the reformer unit 32.

The CO selective oxidizing unit 34 receives supplies of the oxidizing gas and the reformed gas produced by the reformer unit 32 and oxidizes carbon monoxide included in the reformed gas preferentially over hydrogen, thereby reducing the concentration of carbon monoxide included in a resulting gaseous fuel. The gaseous fuel is fed to the fuel cells 20 via a gaseous fuel supply conduit 18. The CO selective oxidizing unit 34 namely works as a carbon monoxide concentration reduction unit in the fuel reformer 30. The CO selective oxidizing unit 34 is filled with alumina pellets with a CO selective oxidizing catalyst, such as a platinum catalyst, supported thereon. The concentration of carbon monoxide included in the gaseous fuel that is obtained by making the reformed gas flow through the CO selective oxidizing unit 34 depends upon the operating temperature of the CO selective oxidizing unit 34, the concentration of carbon monoxide included in the supply of reformed gas, and the flow rate (space velocity) of the reformed gas fed to the CO selective oxidizing unit 34 per unit volume of the catalyst. The structure of the CO selective oxidizing unit 34 is essential of the present invention and will be discussed in detail later.

A temperature sensor 35 for measuring the inner temperature of the CO selective oxidizing unit 34 is disposed in the CO selective oxidizing unit 34. The temperature sensor 35 is made of a thermocouple and arranged to be in contact with the CO selective oxidizing catalyst. The temperature sensor 35 is connected to the control unit 70 and outputs information regarding the inner temperature of the CO selective oxidizing unit 34 to the control unit 70. The control unit 70 controls the positions of the valves 16B and 17B based on the input information and regulates the amount of the crude fuel that circulates through the circumferential portion of the CO selective oxidizing unit 34 and thereby cools down the CO selective oxidizing unit 34. Regulation of the amount of the circulating crude fuel controls the inner temperature of the CO selective oxidizing unit 34 within a predetermined range.

Figure 3:
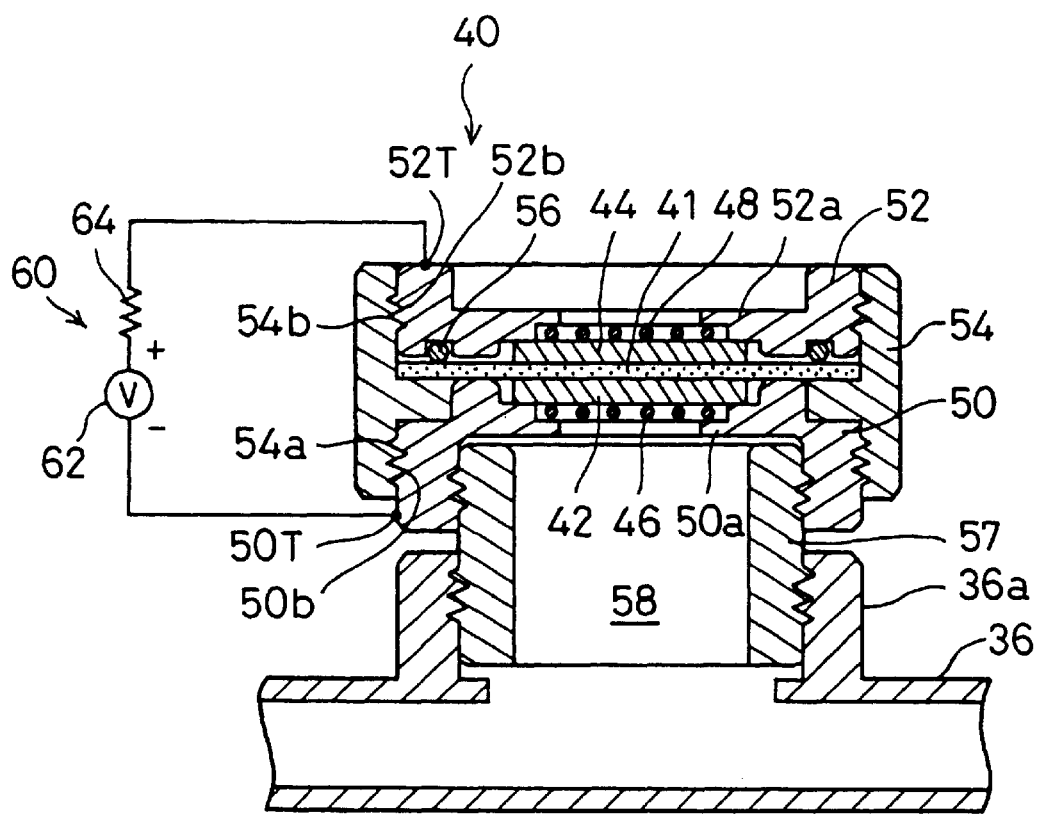
FIG. 3 is a cross sectional view illustrating structure of a carbon monoxide sensor 40.

The carbon monoxide sensor 40 measures the concentration of carbon monoxide included in the reformed gas fed to the CO selective oxidizing unit 34 and has the structure shown in FIG. 3. The carbon monoxide sensor 40 includes an electrolyte membrane 41, two electrodes 42 and 44, metal plates 46 and 48, two holders 50 and 52, and an insulating member 54. The electrolyte membrane 41 is a proton-conductive membrane composed of a polymer electrolyte material, such as a fluororesin. The electrodes 42 and 44 are made of a carbon cloth with a platinum catalyst or a platinum alloy catalyst supported thereon. The electrolyte membrane 41 is interposed between the surfaces of the electrodes 42 and 44 with the catalyst incorporated therein to construct a sandwich-like structure. The metal plates 46 and 48 are meshed metal plates and arranged across the sandwich-like structure for preventing deflection of the sandwich-like structure. The holders 50 and 52 are made of a material having the excellent electrical conductivity and support the sandwich-like structure and the metal plates 46 and 48. The insulating member 54 couples the holders 50 and 52 with each other in an electrically insulating state. The following describes the detailed structure of the carbon monoxide sensor 40.

The holders 50 and 52 respectively have flanges 50a and 52a projected inward from the cylindrical holder structures 50 and 52. The electrolyte membrane 41, the pair of electrodes 42 and 44, and the meshed metal plates 46 and 48 are supported by these flanges 50a and 52a of the holders 50 and 52. The holder 52 is provided with an O-ring 56, which comes into contact with the electrolyte membrane 41 and prevents an atmosphere of one electrode from leaking to the other electrode. The holders 50 and 52 respectively have, on the circumferences thereof, outer screw threads 50b and 52b, which mate and engage with inner screw threads 54a and 54b formed inside the insulating member 54. Engagement of the mating screw threads 50b,52b and 54a,54b enables the holders 50 and 52 to connect with each other and securely support the sandwich-like structure of the electrode 42-electrolyte membrane 41-electrode 44 placed therebetween.

The carbon monoxide sensor 40 further includes a conduit member 57 linked with one holder 50 via mating screw threads to define a gas in-flow conduit 58, which leads the reformed gas into the electrode 42. The conduit member 57 is composed of an insulating material and screwed to an opening 36a formed in the reformed gas supply conduit 36. The other holder 52 does not connect with any specific gas conduit, but the electrode 44 is exposed to the atmosphere.

The carbon monoxide sensor 40 is also provided with an electric circuit 60, which electrically connects detection terminals 50T and 52T of the holders 50 and 52 and measures an electromotive force generated between the electrodes 42 and 44. The electric circuit 60 includes a voltmeter 62 and a resistor 64 for adjusting the load current. The voltmeter 62 is connected to the control unit 70. Connection of the voltmeter 62 is determined to give negative polarity to the detection terminal 50T of the holder 50 on the side of the electrode 42 exposed to the reformed gas and positive polarity to the detection terminal 52T of the holder 52 on the side of the electrode 44 exposed to the atmosphere.

In the carbon monoxide sensor 40, when the reformed gas is supplied to the electrode 42, an electromotive force is generated between the electrodes 42 and 44 via the electrolyte membrane 41. The voltmeter 62 in the electric circuit 60 measures this electromotive force. The sandwich-like structure of the electrolyte membrane 41 and the electrodes 42 and 44 is identical with the structure of the unit cell 28 of the polymer electrolyte fuel cells 20 discussed above. Supply of the reformed gas containing carbon monoxide to such a structure causes the catalyst to be poisoned by carbon monoxide and thereby leads to a decrease in electromotive force. The electromotive force decreases with an increase in concentration of carbon monoxide. In this embodiment, the relationship between the concentration of carbon monoxide and the measurement of the voltmeter 62 is examined in advance. The measurement of the electromotive force then determines the concentration of carbon monoxide included in the reformed gas.

In addition to the carbon monoxide sensor 40, the gas flow sensor 37 is disposed in the middle of the reformed gas supply conduit 36 as shown in FIG. 1. The gas flow sensor 37 measures the flow rate of the reformed gas fed to the CO selective oxidizing unit 34 via the reformed gas supply conduit 36. In this embodiment, a Doppler sensor is used as the gas flow sensor 37. Both the gas flow sensor 37 and the carbon monoxide sensor 70 are connected to the control unit 70 and output information regarding the measured gas flow rate and concentration of carbon monoxide into the control unit 70.

As mentioned above, the fuel reformer 30 has the blower 38, which introduces the oxygen-containing oxidizing gas (the air in this embodiment) into the reformed gas flowing through the reformed gas supply conduit 36 via the induction pipe 39, which is connected to the reformed gas supply conduit 36 and arranged after the carbon monoxide sensor 40 and the gas flow sensor 37. The blower 38 is also connected to the control unit 70 and driven in response to a driving signal output from the control unit 70. The control unit 70 calculates the amount of the oxidizing gas required for oxidizing carbon monoxide in the reformed gas fed to the CO selective oxidizing unit 34, based on the input information from the gas flow sensor 37 and the carbon monoxide sensor 40, and drives the blower 38 according to the result of calculation. The reformed gas is accordingly mixed with the required amount of oxygen for oxidation of carbon monoxide and then fed to the CO selective oxidizing unit 34. The supply of the oxidizing gas is regulated according to the molar ratio of oxygen to carbon monoxide [$O_2$]/[CO]. The reference molar ratio of oxygen to carbon monoxide [$O_2$]/[CO] was determined experimentally.

The molar ratio is equal to 0.5, provided that the oxidation reaction of carbon monoxide proceeds ideally. It is, however, required to add a greater amount of oxygen for the sufficient oxidation reaction of carbon monoxide in the carbon monoxide concentration reduction unit. The excess amount of oxygen causes oxidation of hydrogen. The increase in amount of oxygen leads to an increase in amount of the air, which undesirably lowers the hydrogen partial pressure in the gaseous fuel. The amount of oxygen that ensures the sufficient oxidation of carbon monoxide was determined experimentally in a range that allowed disadvantages due to the increase in amount of the air. The supply of oxygen was varied while a model gas ($H_2$=75%, $CO_2$=24.5%, CO=0.5%) was fed to a CO selective oxidizing unit, which had the same structure as that of the CO selective oxidizing unit 34 of this embodiment, at a space velocity of 5000 $h^{-1}$. The favorable molar ratio ranged from 2 to 3. In this embodiment, the value '3' was accordingly adopted as the molar ratio of oxygen to carbon monoxide.

Referring back to FIG. 1, the control unit 70 is constructed as an arithmetic and logic circuit with a microcomputer. The control unit 70 includes a CPU 72 for carrying out a variety of arithmetic and logic operations according to preset control programs, a ROM 74, in which control programs and control data required for the variety of operations carried out by the CPU 72 are stored in advance, a RAM 76, which various data required for the variety of operations carried out by the CPU 72 are temporarily written in and read out, and an input/output port 78 that receives detection signals from various sensors, such as the voltmeter 62 of the carbon monoxide sensor 40 and the gas flow sensor 37, and outputs driving signals to the reformer unit 32, the CO selective oxidizing unit 34, the blower 38, the carbon monoxide sensor 40, and the like based on the results of operations carried out by the CPU 72.

Figure 4:
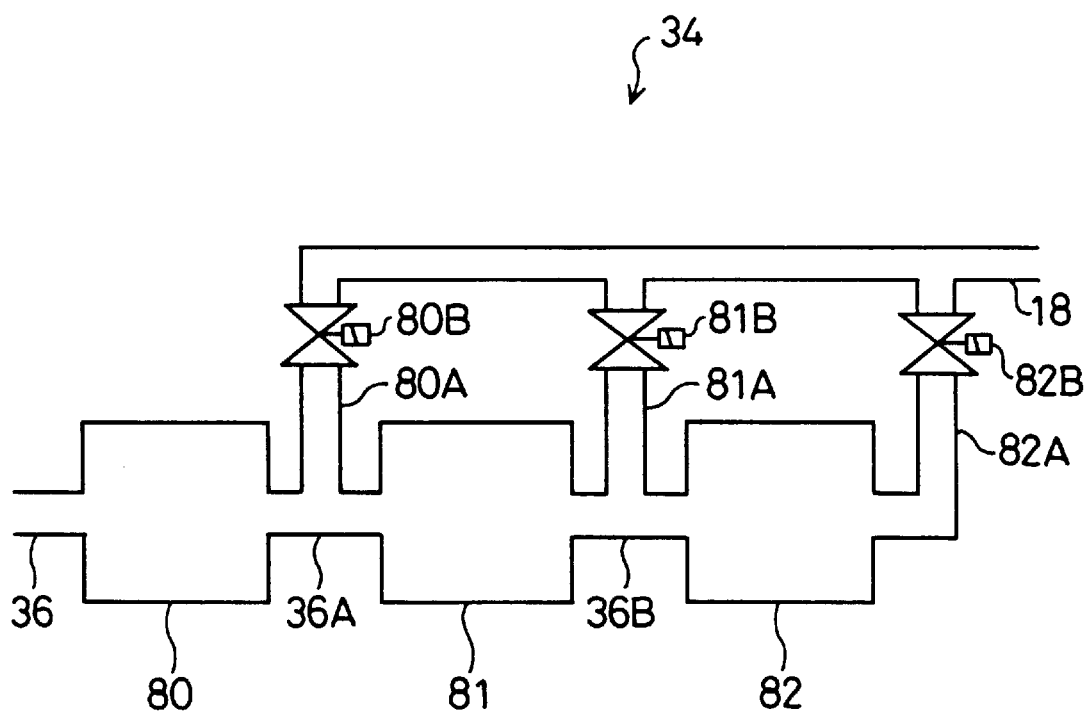
FIG. 4 shows structure of the CO selective oxidizing unit 34 of the first embodiment.

As mentioned above, the CO selective oxidizing unit 34 is essential to the present invention. FIG. 4 schematically illustrates structure of the CO selective oxidizing unit 34 included in the fuel-cells system 10 of the first embodiment. The CO selective oxidizing unit 34 includes a first reaction chamber 80, a second reaction chamber 81, and a third reaction chamber 82. These reaction chambers are filled with the alumina pellets with the CO selective oxidizing catalyst, that is, the platinum catalyst, supported thereon. The first reaction chamber 80, the second reaction chamber 81, and the third reaction chamber 82 are connected in series in this sequence. A first connection path 36A connects the first reaction chamber 80 with the second reaction chamber 81, whereas a second connection path 36B connects the second reaction chamber 81 with the third reaction chamber 82. The reformed gas that is subjected to the selective oxidation reaction of carbon monoxide in the upstream reaction chamber is flown into the downstream reaction chambers via the connection paths.

The CO selective oxidizing unit 34 reduces the concentration of carbon monoxide included in the reformed gas and supplies the resulting gaseous fuel to the fuel cells 20 via the gaseous fuel supply conduit 18. The gaseous fuel supply conduit 18 is connected with reformed gas discharge conduits 80A, 81A, and 82A, which lead the reformed gases discharged from the respective reaction chambers to the gaseous fuel supply conduit 18. The reformed gas discharge conduit 80A connects the first connection path 36A with the gaseous fuel supply conduit 18. This configuration enables the reformed gas containing the reduced concentration of carbon monoxide by the first reaction chamber 80 not to pass through the second reaction chamber 81 and the third reaction chamber 82 but to be fed to the gaseous fuel supply conduit 18 via the reformed gas discharge conduit 80A. In a similar manner, the reformed gas discharge conduit 81A connects the second connection path 36B with the gaseous fuel supply conduit 18. This configuration enables the reformed gas containing the more reduced concentration of carbon monoxide by the first reaction chamber 80 and the second reaction chamber 81 not to pass through the third reaction chamber 82 but to be fed to the gaseous fuel supply conduit 18 via the reformed gas discharge conduit 81A. The reformed gas discharge conduit 82A connects the third reaction chamber 82 with the gaseous fuel supply conduit 18. This configuration enables the reformed gas containing the most reduced concentration of carbon monoxide by the first through the third reaction chambers 80 through 82 to be fed to the gaseous fuel supply conduit 18 via the reformed gas discharge conduit 82A.

The reformed gas discharge conduits 80A, 81A, and 82A are respectively provided with valves 80B, 81B, and 82B. Control of the on/off state of these valves varies the number of the reaction chambers involved in the oxidation reaction for reducing the concentration of carbon monoxide in the reformed gas. By way of example, in case that only the valve 80B is in the open position, only the first reaction chamber 80 is used to reduce the concentration of carbon monoxide in the reformed gas. In case that only the valve 81B is in the open position, the first reaction chamber 80 and the second reaction chamber 81 are used to reduce the concentration of carbon monoxide in the reformed gas. In case that only the valve 82B is in the open position, all the reaction chambers 80 through 82 are used to reduce the concentration of carbon monoxide in the reformed gas. All the valves 80B, 81B, and 82B are connected to the control unit 70 and controlled on and off in response to the driving signals output from the control unit 70.

The following describes a control procedure of regulating the amount of the CO selective oxidizing catalyst carried out in the CO selective oxidizing unit 34 of the fuel-cells system thus constructed. In the CO selective oxidizing unit 34, the change of the on/off state of the valves 80B, 81B, and 82B according to the flow rate of the reformed gas varies the number of the reaction chambers involved in the selective oxidation reaction for reducing the concentration of carbon monoxide and regulates the amount of the catalyst used for the selective oxidation reaction. The relationship between the flow rate of the reformed gas and the amount of the CO selective oxidizing catalyst is described first.

Figure 5:
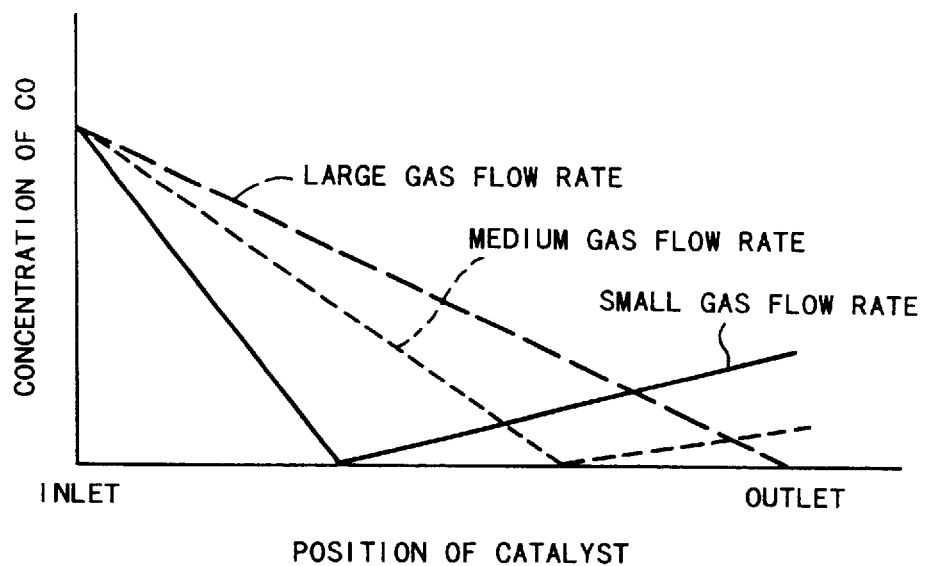
FIG. 5 is a graph showing variations in concentration of carbon monoxide included in the reformed gas passing through a CO selective oxidizing unit.

FIG. 5 shows variations in concentration of carbon monoxide included in a carbon monoxide-containing, hydrogen-rich gas along the direction of a flow of the hydrogen-rich gas. In the CO selective oxidizing unit having a single reaction chamber filled with the CO selective oxidizing catalyst, the hydrogen-rich gas was flown through an inlet, subjected to the selective oxidation reaction for reducing the concentration of carbon monoxide, and discharged from an outlet. The measurement was carried out for the three different flow rates of the gas fed to the CO selective oxidizing unit. As shown in the graph of FIG. 5, the catalytic function of the CO selective oxidizing catalyst gradually decreases the concentration of carbon monoxide included in the hydrogen-rich gas fed to the CO selective oxidizing unit. After the conclusion of the oxidation reaction of carbon monoxide, the concentration of carbon monoxide rises again. The increase in concentration of carbon monoxide is ascribed to evolution of carbon monoxide through the reverse shift reaction expressed by Equation (8) discussed above. The greater amount of the gas fed to the CO selective oxidizing unit shifts the position of conclusion of the oxidation reaction of carbon monoxide toward the outlet. In other words, the smaller amount of the gas shifts the position of conclusion of the oxidation reaction of carbon monoxide toward the inlet. This is because the smaller amount of the gas lowers the space velocity and concludes the oxidation reaction of carbon monoxide at an earlier stage. The earlier conclusion of the oxidation reaction of carbon monoxide increases the amount of carbon monoxide evolved through the subsequent reverse shift reaction and results in an insufficient reduction of concentration of carbon monoxide.

Figure 6:
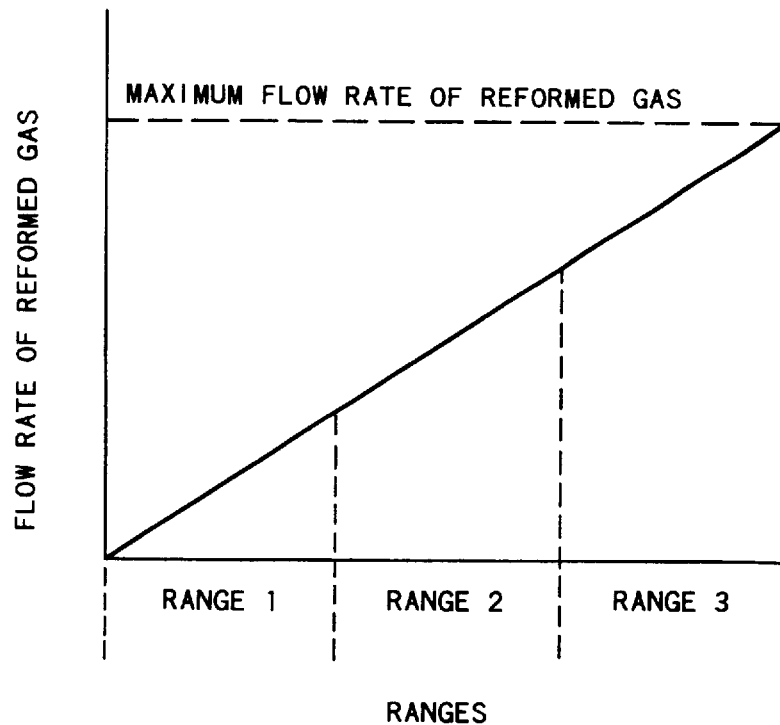
FIG. 6 is a graph showing the flow rate of the reformed gas fed to the CO selective oxidizing unit 34 plotted against the classified ranges.

The structure of this embodiment, on the other hand, has the catalyst amount regulation means and classifies the amount of the reformed gas that can be processed by the CO selective oxidizing unit 34 into three ranges (ranges 1 through 3), which correspond to the number of the reaction chambers included in the CO selective oxidizing unit 34, as shown in FIG. 6. The number of the reaction chambers involved in the selective oxidation reaction of carbon monoxide is varied according to the flow rate of the reformed gas. In case that the amount of the reformed gas is in the range 1, only the first reaction chamber 80 is activated. In case that the amount of the reformed gas is in the range 2, the first reaction chamber 80 and the econd reaction chamber 81 are activated. In case that the amount of the reformed gas is in the range 3, all the reaction chambers 80 through 82 are activated.

Figure 7:
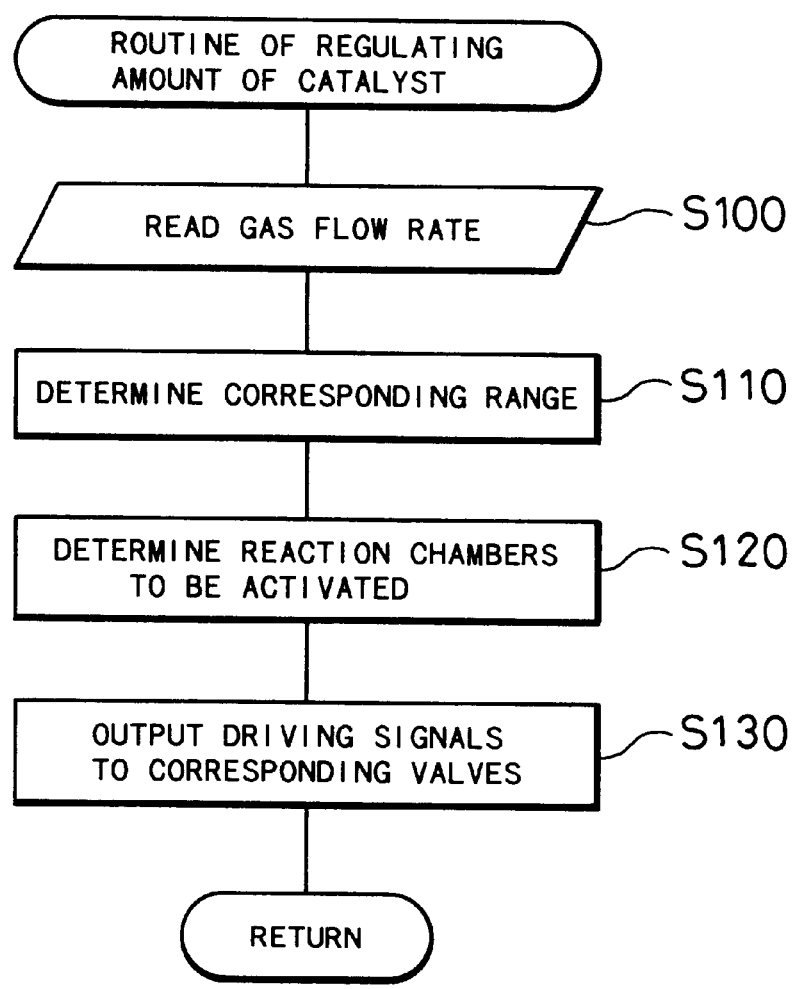
FIG. 7 is a flowchart showing a routine of regulating the amount of a catalyst in the CO selective oxidizing unit 34.

When the fuel reformer 30 starts operation, the control unit 70 carries out a routine of regulating the amount of the catalyst shown in the flowchart of FIG. 7 at predetermined time intervals, for example, at every 100 msec in this embodiment. The routine regulates the amount of the CO selective oxidizing catalyst used for the selective oxidation reaction to be suitable for the supply of the reformed gas.

When the program enters the routine of FIG. 7, the CPU 72 first reads a flow rate of the reformed gas measured by the gas flow sensor 37 at step S100 and determines the range corresponding to the input gas flow rate at step S110. A map representing the relationship between the gas flow rate and the range as shown in FIG. 6 is stored in advance in the ROM 74. The range corresponding to the input gas flow rate is accordingly read from the map.

The CPU 72 then determines the reaction chambers to be activated corresponding to the range at step S120, and outputs driving signals to the valves, which are arranged down the respective reaction chambers, so as to control the on/off state of the valves at step S130. This procedure enables the reformed gas to be fed to only the activated reaction chambers. The program then exits from this routine.

In the case of the small gas flow rate, the structure of the first embodiment discharges the reformed gas from the CO selective oxidizing unit 34 at the time of conclusion of the oxidation reaction of carbon monoxide and before the progress of the reverse shift reaction. This structure sufficiently reduces the concentration of carbon monoxide included in the resulting gaseous fuel. As discussed previously, in the CO selective oxidizing unit 34 of this embodiment, the area filled with the CO selective oxidizing catalyst is divided into three reaction chambers, and the number of the reaction chambers involved in the selective oxidation reaction is varied according to the flow rate of the reformed gas. In the case of the small gas flow rate, the number of the activated reaction chambers is reduced to decrease the amount of the CO selective oxidizing catalyst. This enables the processed reformed gas to be discharged as the gaseous fuel from the CO selective oxidizing unit 34 at the time of conclusion of the oxidation reaction of carbon monoxide and before the progress of the reverse shift reaction. In the case of the large gas flow rate, on the other hand, the number of the activated reaction chambers is increased to ensure the sufficient amount of the catalyst.

The CO selective oxidizing unit 34 included in the fuel-cells system 10 of the first embodiment carries out the selective oxidation reaction of carbon monoxide at the space velocity that is close to the optimum condition, thereby sufficiently reducing the concentration of carbon monoxide included in the resulting gaseous fuel. The number of the activated reaction chambers, that is, the amount of the catalyst involved in the selective oxidation reaction, is determined according to the flow rate of the reformed gas. In case that the amount of the catalyst is greater than the optimum condition, this structure restricts the amount of carbon monoxide evolved by the reverse shift reaction to be within an allowable tracing range. This structure thus effectively prevents the concentration of carbon monoxide in the gaseous fuel from increasing through the reverse shift reaction. In case that the amount of the catalyst is smaller than the optimum condition, on the other hand, this structure restricts the amount of carbon monoxide that has not been oxidized but remains to be within an allowable tracing range.

In the first embodiment, the respective reaction chambers are connected in series in the CO selective oxidizing unit 34. These reaction chambers may, however, be connected in parallel or in any other configuration. Although the CO selective oxidizing unit 34 of the first embodiment has three reaction chambers, the number of the reaction chambers may be decreased to two or increased to four or more. In this embodiment, the number of the activated reaction chambers is determined, directly based on the flow rate of the reformed gas measured by the gas flow sensor 37. The number of the activated reaction chambers may alternatively be determined, indirectly based on the flow rate of the reformed gas. By way of example, the supply of methanol fed from the methanol tank 12 to the fuel reformer 30 is input, instead of the flow rate of the reformed gas, to determine the number of the activated reaction chambers. The number of the activated reaction chambers can be determined, based on any value varying with the variation in flow rate of the reformed gas.

Figure 8:
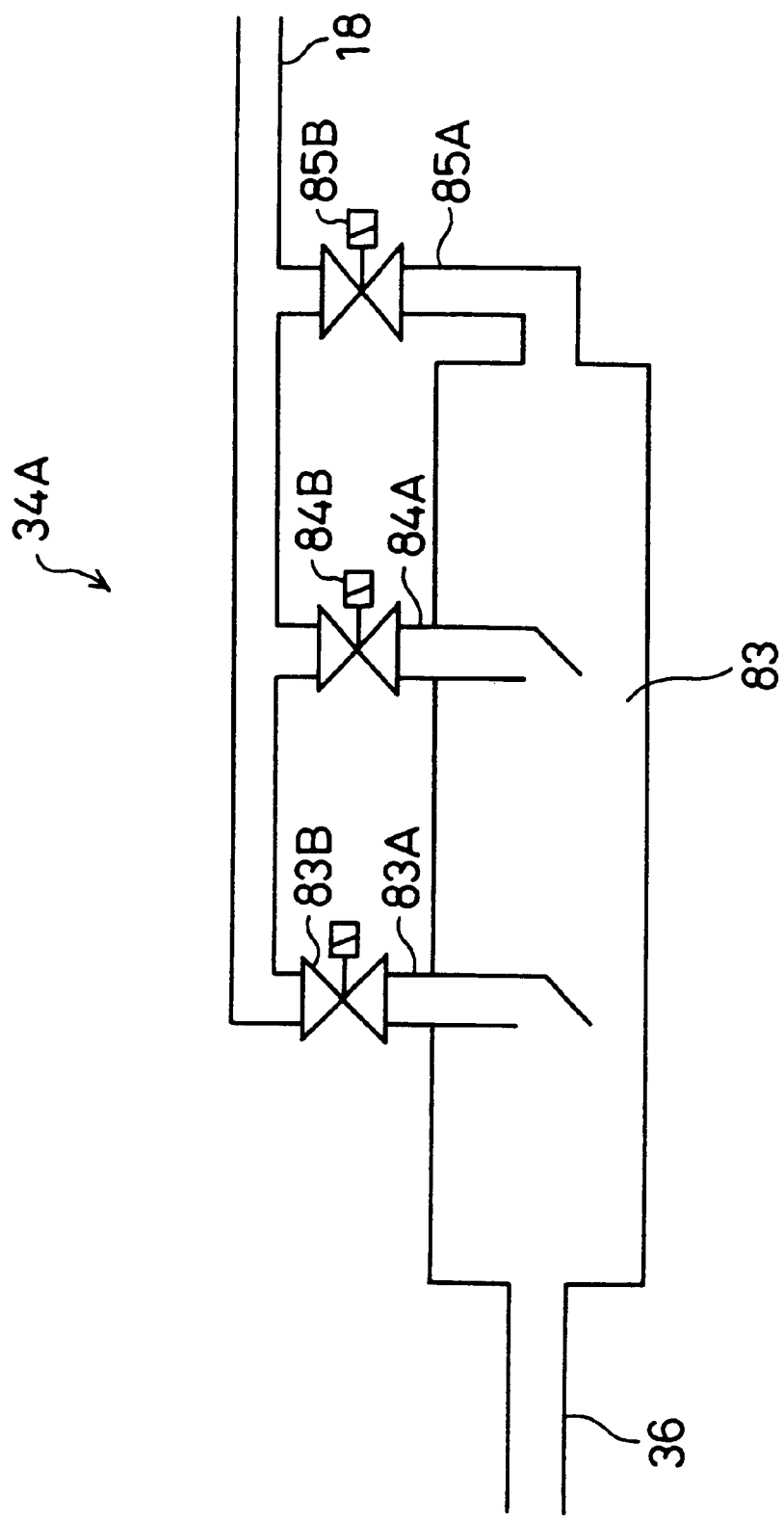
FIG. 8 shows structure of another CO selective oxidizing unit 34A as a second embodiment according to the present invention.

In the CO selective oxidizing unit 34 of the first embodiment, the area filled with the CO selective oxidizing catalyst is divided into the three separate reaction chambers, in order to vary the amount of the catalyst used for the selective oxidation reaction. In accordance with another possible structure, the CO selective oxidizing unit has only one reaction chamber with a plurality of openings arranged along the direction of the flow of the reformed gas for discharging the gaseous fuel from the reaction chamber. This structure is discussed below as a second embodiment according to the present invention. FIG. 8 shows structure of a CO selective oxidizing unit 34A of the second embodiment. The CO selective oxidizing unit 34A is incorporated in a fuel-cells system 10A, which has the same structure as that of the fuel-cells system 10 of the first embodiment except the CO selective oxidizing unit and is thus not specifically described here.

Referring to FIG. 8, the CO selective oxidizing unit 34A of the second embodiment has a reaction chamber 83 filled with a CO selective oxidizing catalyst and receives a supply of the reformed gas from the reformer unit 32 via the reformed gas supply conduit 36. The reaction chamber 83 reduces the concentration of carbon monoxide in the reformed gas and supplies the resulting gaseous fuel containing the reduced concentration of carbon monoxide to the fuel cells 20 via the gaseous fuel supply conduit 18. Like the first embodiment, the CO selective oxidizing catalyst packed in the reaction chamber 83 is the platinum catalyst supported on the alumina pellets.

The CO selective oxidizing unit 34A has reformed gas discharge conduits 83A, 84A, and 85A as the structure of connecting the reaction chamber 83 with the gaseous fuel supply conduit 18. The reformed gas discharge conduit 83A has an opening end at the position apart from an inlet by a distance of approximately one third the whole length of the reaction chamber 83. The reformed gas discharge conduit 84A has an opening end at the position apart from the inlet by a distance of approximately two thirds the whole length of the reaction chamber 83. The reformed gas discharge conduit 85A has an opening end at the position of an outlet of the reaction chamber 83. The other ends of the respective reformed gas discharge conduits 83A, 84A, 85A are open to the gaseous fuel supply conduit 18. The reformed gas discharge conduits 83A, 84A, and 85A are respectively provided with valves 83B, 84B, and 85B, which are controlled on and off by the driving signals output from the control unit 70.

The control unit 70 sets only one valve selected among the three valves 83B, 84B, 85B to the open position. In case that the valve 83B is in the open position, the reformed gas passing through the surface of the catalyst packed in the area of the first one third of the reaction chamber 83 is discharged from the reaction chamber 83 and fed as the gaseous fuel to the fuel cells 20. In case that the valve 84B is in the open position, the reformed gas passing through the surface of the catalyst packed in the area of the first two thirds of the reaction chamber 83 is fed as the gaseous fuel to the fuel cells 20. In case that the valve 85B is in the open position, the reformed gas passing through the surface of the whole catalyst packed in the reaction chamber 83 is fed as the gaseous fuel to the fuel cells 20.

In the fuel-cells system 10A of the second embodiment having the CO selective oxidizing unit 34A thus constructed, the control unit 70 carries out a routine of regulating the amount of the catalyst, which is similar to the routine of the first embodiment shown in FIG. 7, based on the flow rate of the reformed gas measured by the gas flow sensor 37. In the second embodiment, in order to regulate the amount of the catalyst, the CPU 72 opens the valve 83B when the input flow rate of the reformed gas is in the range 1, opens the valve 84B when the input flow rate of the reformed gas is in the range 2, and opens the valve 85B when the input flow rate of the reformed gas is in the range 3.

Like the CO selective oxidizing unit 34 of the first embodiment, the CO selective oxidizing unit 34A of the second embodiment carries out the selective oxidation reaction of carbon monoxide at the space velocity that is close to the optimum condition, thereby sufficiently reducing the concentration of carbon monoxide included in the resulting gaseous fuel. The area in the reaction chamber 83 involved in the selective oxidation reaction, that is, the amount of the catalyst used for the selective oxidation reaction, is varied according to the flow rate of the reformed gas. In case that the amount of the catalyst is greater than the optimum condition, this structure restricts the amount of carbon monoxide evolved by the reverse shift reaction to be within an allowable tracing range. In case that the amount of the catalyst is smaller than the optimum condition, on the other hand, this structure restricts the amount of carbon monoxide that has not been oxidized but remains to be within an allowable tracing range. In the CO selective oxidizing unit 34A of the second embodiment, there are three openings for discharging the gaseous fuel from the reaction chamber 83 to the gaseous fuel supply conduit 18. The number of the openings may, however, be decreased to two or increased to four or more. The amount of the reformed gas fed to the CO selective oxidizing unit 34A may be obtained indirectly from another value, in the same manner as the first embodiment.

Figure 9:
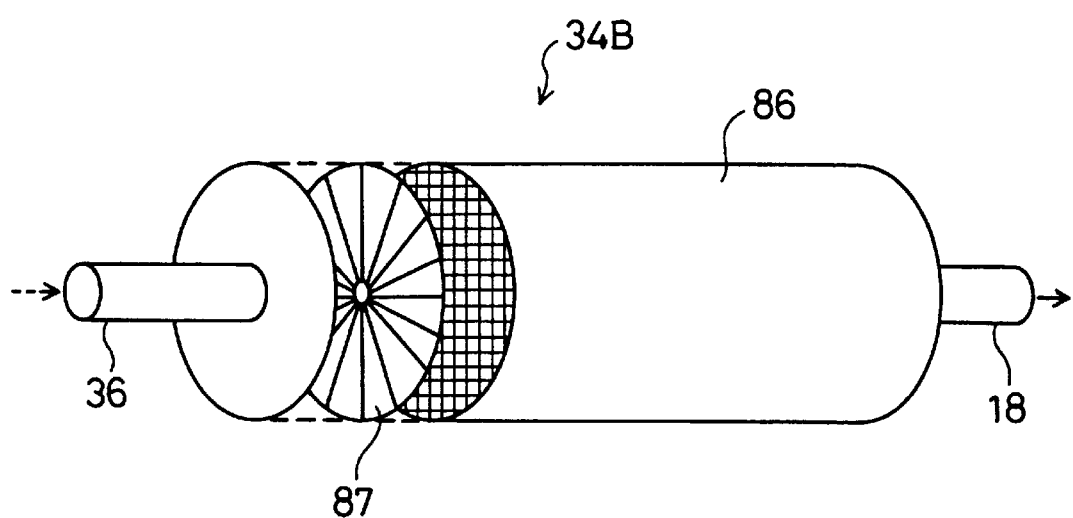
FIG. 9 shows structure of still another CO selective oxidizing unit 34B as a third embodiment according to the present invention.

In the first and the second embodiments, the reaction chamber included in the CO selective oxidizing unit is filled with the pellets having the CO selective oxidizing catalyst supported thereon, and the reformed gas fed into the CO selective oxidizing unit diffuses through the reaction chamber. The amount of the catalyst is accordingly varied by dividing the reaction chamber and switching the outlet of the gaseous fuel. In accordance with another possible structure, the reaction chamber is made of a honeycomb tube and varies the amount of the catalyst by switching the inlet of the reformed gas. In the structure having the reaction chamber made of a honeycomb tube, the area filled with the CO selective oxidizing catalyst is divided in parallel to the direction of the flow of the reformed gas. The amount of the catalyst is varied by changing the number of cells in the honeycomb tube, to which the reformed gas is supplied. This structure is discussed below as a third embodiment according to the present invention. FIG. 9 shows structure of a CO selective oxidizing unit 34B of the third embodiment. The CO selective oxidizing unit 34B of the third embodiment has a reaction chamber 86 made of a honeycomb tube and a movable mask 87 disposed at an inlet of the reaction chamber 86. The CO selective oxidizing unit 34B is incorporated in a fuel-cells system 10B, which has the same structure as that of the fuel-cells system 10 of the first embodiment except the CO selective oxidizing unit and is thus not specifically described here.

Figure 10:
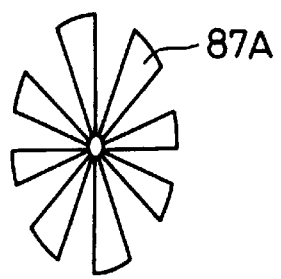
FIG. 10 illustrates a mask 87A used in the CO selective oxidizing unit 34B of the third embodiment.

The honeycomb tube constituting the reaction chamber 86 of the CO selective oxidizing unit 34B has a plurality of cells with the CO selective oxidizing catalyst, that is, the platinum catalyst, supported on the surface thereof. The reformed gas introduced into the honeycomb tube passes through the surface of the platinum catalyst on the honeycomb tube. This reduces the concentration of carbon monoxide in the reformed gas. The movable mask 87 disposed at the inlet of the reaction chamber 86 consists of two impeller-type masks 87A shown in FIG. 10. Each mask 87A is brought into contact with the inlet of the honeycomb tube and rotatably supported on a rotating shaft (not shown) that is disposed on the approximate center of the cross section at the inlet of the reaction chamber 86. A specific area of the honeycomb tube that is blocked by the movable mask 87 can not receive the supply of the reformed gas. The number of cells in the honeycomb tube that can receive the supply of the reformed gas is varied by changing the overlapping state of the masks 87A. When the two masks 87A do not overlap each other at all, the inlet of the reaction chamber 86 is completely closed (opening ratio of 0%). When the two masks 87A completely overlap each other, the maximum number of cells in the honeycomb tube can receive the supply of the reformed gas (opening ratio of 100%). The movable mask 87 is connected to the control unit 70, which outputs a driving signal to control the overlapping state of the two masks 87A.

Figure 11:
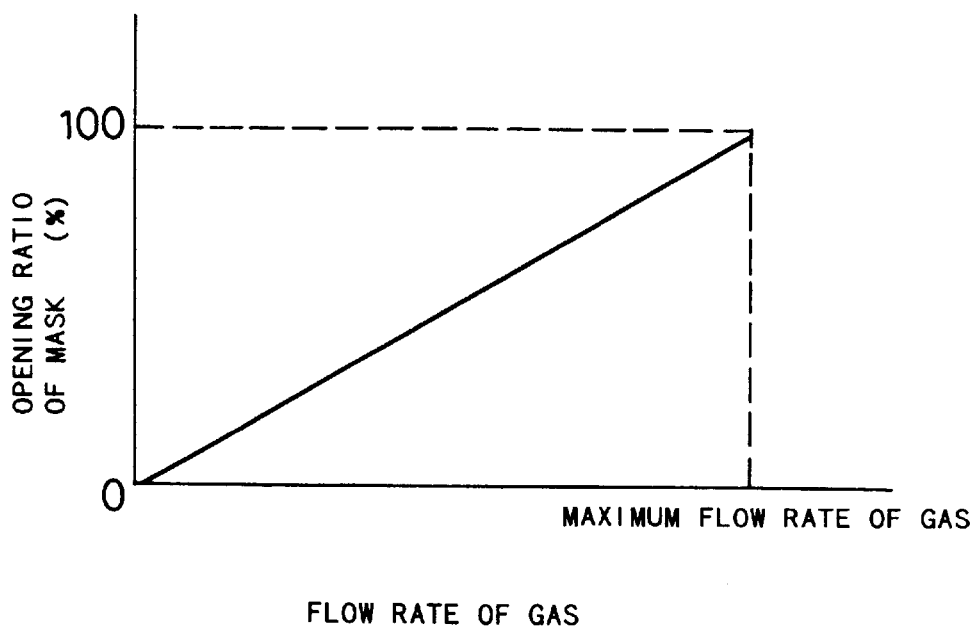
FIG. 11 is a graph showing the relationship between the mask opening ratio and the flow rate of the reformed gas regulated in the CO selective oxidizing unit 34B of the third embodiment.

The following discusses regulation of the opening ratio of the movable mask 87 carried out in the CO selective oxidizing unit 34B of the third embodiment. In the CO selective oxidizing unit 34B of the third embodiment, the opening ratio of the movable mask 87 is regulated according to the flow rate of the reformed gas measured by the gas flow sensor 37, so as to vary the amount of the catalyst used for the selective oxidation reaction. FIG. 11 is a graph showing the relationship between the flow rate of the reformed gas and the opening ratio of the movable mask 87, which is stored in the control unit 70 of the third embodiment. The regulation of the amount of the catalyst depends upon this relationship.

Figure 12:
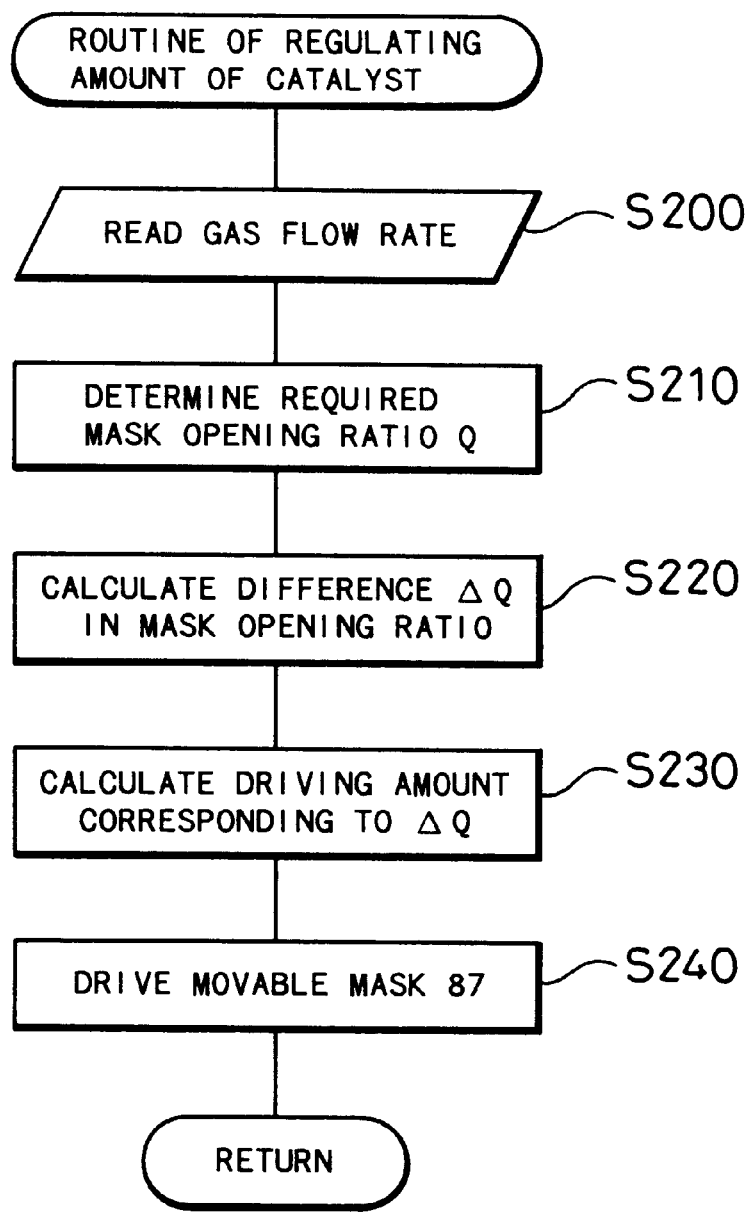
FIG. 12 is a flowchart showing a routine of regulating the opening ratio in the CO selective oxidizing unit 34B.

When the fuel reformer 30 of the third embodiment starts operation, the control unit 70 carries out a routine of regulating the amount of the catalyst shown in the flowchart of FIG. 12 at predetermined time intervals, for example, at every 100 msec in this embodiment. The routine regulates the amount of the CO selective oxidizing catalyst used for the selective oxidation reaction to be suitable for the supply of the reformed gas.

When the program enters the routine of FIG. 12, the CPU 72 first reads a flow rate of the reformed gas measured by the gas flow sensor 37 at step S200 and determines a required mask opening ratio Q corresponding to the input gas flow rate at step S210. As discussed above, a map representing the relationship between the gas flow rate and the mask opening ratio as shown in FIG. 11 is stored in advance in the ROM 74. The mask opening ratio Q corresponding to the input gas flow rate is accordingly read from the map.

The CPU 72 then calculates a difference ΔQ between the required mask opening ratio Q and the actual mask opening ratio at step S220 and calculates a driving amount of the movable mask 87 required for increasing or decreasing the mask opening ratio by the difference ΔQ at step S230. At subsequent step S240, the CPU 72 outputs a driving signal, which represents the driving amount calculated at step S230, to the movable mask 87. The program then exits from this routine. The actuation of the movable mask 87 in this manner makes the actual opening ratio of the movable mask 87 equal to the required mask opening ratio Q specified at step S210.

Like the first and the second embodiments, the CO selective oxidizing unit 34B of the third embodiment carries out the selective oxidation reaction of carbon monoxide at the space velocity that is close to the optimum condition, thereby sufficiently reducing the concentration of carbon monoxide included in the resulting gaseous fuel. The structure of the third embodiment varies the amount of the catalyst by regulating the continuously controllable mask opening ratio. Compared with the first and the second embodiments, the third embodiment accordingly enables the selective oxidation reaction of carbon monoxide with the amount of the catalyst closer to the optimum condition, thus further reducing the concentration of carbon monoxide included in the gaseous fuel. In accordance with one favorable application, the amount of the catalyst at the opening ratio of 100% is set as the amount of the catalyst that enables conclusion of the oxidation reaction of carbon monoxide at the outlet of the CO selective oxidizing unit 34B, on the assumption that the CO selective oxidizing unit 34B receives the maximum flow rate of the reformed gas. Irrespective of the variation in amount of the reformed gas subjected to the selective oxidation reaction of carbon monoxide in the CO selective oxidizing unit 34B, this structure regulates the amount of the catalyst to the optimum level and sufficiently reduces the concentration of carbon monoxide included in the resulting gaseous fuel.

In the third embodiment discussed above, the impeller-type masks 87A shown in FIG. 10 are disposed at the inlet of the honeycomb tube in order to vary the number of cells in the honeycomb tube that receive the supply of the reformed gas. The area of the honeycomb tube that receives the supply of the reformed gas is varied by changing the overlapping state of the two masks 87A. The mechanism of varying the area of the honeycomb tube that receives the supply of the reformed gas is not restricted to the above structure. For example, any mask may be used instead of the impeller-type mask, as long as it can block the inlet of the honeycomb tube and vary the blocked area. Any equivalent mechanism having the same effect as the rotation of the mask may also be applicable.

In the CO selective oxidizing unit 34B of the third embodiment, the reaction chamber is made of the honeycomb tube with the catalyst supported on the surface thereof. This enables regulation of the amount of the catalyst by varying the blocked area of the inlet. Any structure that prevents the reformed gas from diffusing in directions other than the direction of the gas flow may be applied to vary the blocked area of the inlet for regulation of the amount of the catalyst. Available examples include the structure of the third embodiment in which the catalyst is supported on the surface of the cells in the honeycomb tube, another structure having the cells in the honeycomb tube that are filled with the catalyst-carrying pellets used in the first and the second embodiments, and still another structure having a plurality of reaction pipes filled with the catalyst-carrying pellets and arranged in parallel.

Figure 13:
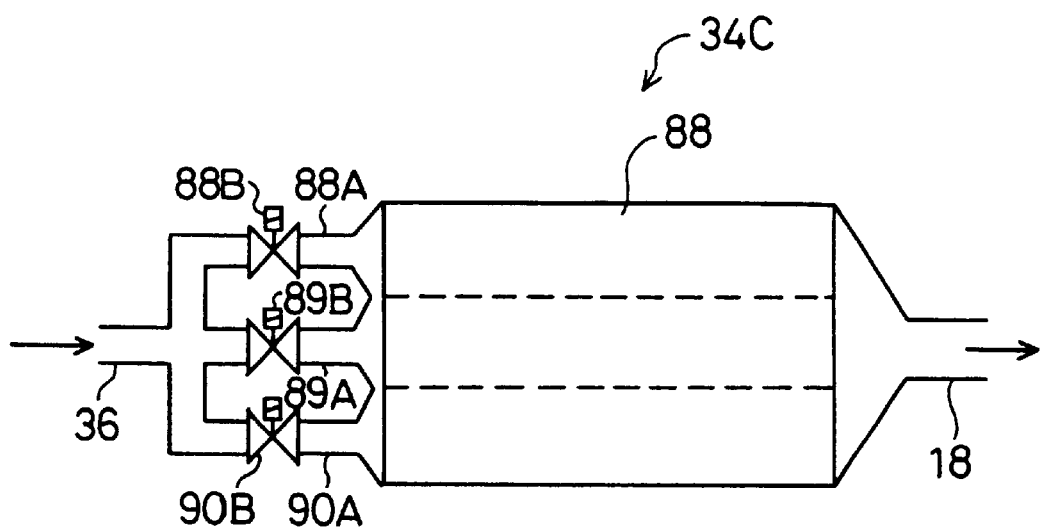
FIG. 13 shows structure of another CO selective oxidizing unit 34C as a fourth embodiment according to the present invention.

In the structure that prevents the reformed gas from diffusing in directions other than the direction of the gas flow, division of the introduction system may be applied, instead of the mechanism of varying the blocked area of the inlet, for regulation of the amount of the catalyst. A CO selective oxidizing unit 34C having such a structure is shown in FIG. 13 and discussed as a fourth embodiment according to the present invention. The CO selective oxidizing unit 34C of the fourth embodiment includes a reaction chamber 88 that is made of a honeycomb tube with the platinum catalyst supported on the surface thereof. Three reformed gas branch paths 88A, 89A, and 90A are arranged between the reformed gas supply conduit 36 and the reaction chamber 88. The reformed gas branch paths 88A, 89A, and 90A are respectively provided with valves 88B, 89B, and 90B. The control unit 70 outputs driving signals to control the on/off state of these valves 88B, 89B, and 90B. Only the cells that are open to the position corresponding to the reformed gas branch path with the valve in the open position can receive the supply of the reformed gas.

In a fuel-cells system OC having the CO selective oxidizing unit 34C of the fourth embodiment, during the operation of the fuel reformer 30, the control unit 70 carries out a routine of regulating the amount of the catalyst, which is equivalent to the routine of the first embodiment shown in FIG. 7, at predetermined time intervals. Like the first embodiment, the gas flow rate measured by the gas flow sensor 37 is classified into the three ranges, that is, the ranges 1 through 3. The number of the valves that are set in the open position is then regulated according to the range, so as to vary the amount of the catalyst used for the selective oxidation reaction of carbon monoxide. In the fourth embodiment, the introduction system of the reformed gas is divided for regulating the amount of the catalyst. In accordance with another possible structure, a nozzle having a variable gas injection angle is attached to an end of the reformed gas supply conduit 36 that connects with the CO selective oxidizing unit. The reformed gas is injected at a predetermined angle from the reformed gas supply conduit 36 into the honeycomb tube. This structure can vary the number of cells in the honeycomb tube that receive the supply of the reformed gas by changing the injection angle of the reformed gas, instead of changing the number of the valves that are set in the open position.

Figure 14:
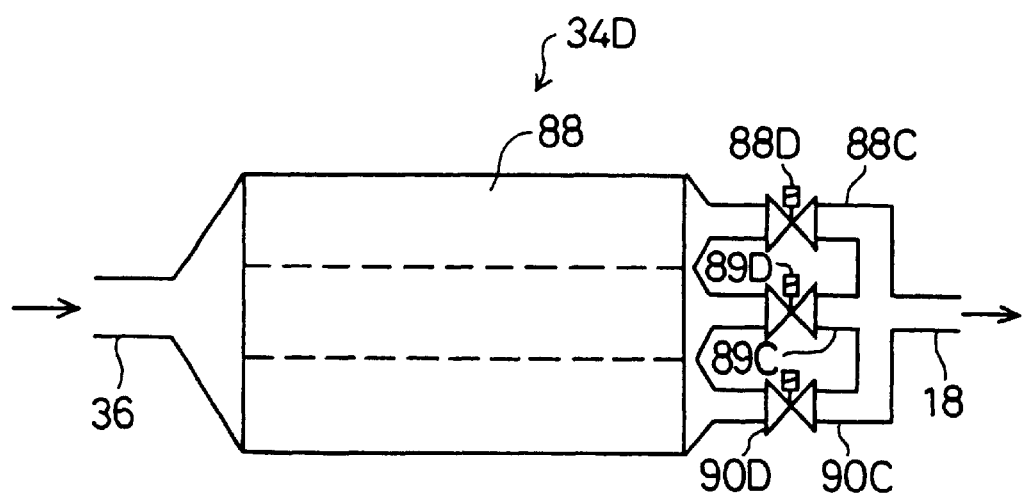
FIG. 14 shows structure of still another CO selective oxidizing unit 34D as a fifth embodiment according to the present invention.

In case that the reaction chamber is divided in parallel to the direction of the gas flow, instead of the division of the introduction system like the CO selective oxidizing unit 34C of the fourth embodiment, the discharge system may be divided for regulation of the amount of the catalyst. A CO selective oxidizing unit 34D having such a structure is shown in FIG. 14 and discussed as a fifth embodiment according to the present invention. The CO selective oxidizing unit 34D of the fifth embodiment has a reaction chamber 88, which is identical with the reaction chamber 88 of the fourth embodiment. Unlike the fourth embodiment, the inlet of the reaction chamber 88 does not connect with the branch paths, but gaseous fuel branch paths 88C, 89C, and 90C are disposed between the outlet of the reaction chamber 88 and the gaseous fuel supply conduit 18. The gaseous fuel branch paths 88C, 89C, and 90C are respectively provided with valves 88D, 89D, and 90D. The control unit 70 outputs driving signals to control the on/off state of these valves 88D, 89D, and 90D. Only the cells that are open to the position corresponding to the gaseous fuel branch path with the valve in the open position can receive the supply of the reformed gas.

Like the fourth embodiment, in a fuel-cells system 10D having the CO selective oxidizing unit 34D of the fifth embodiment, during the operation of the fuel reformer 30, the control unit 70 carries out a routine of regulating the amount of the catalyst, which is equivalent to the routine of the first embodiment shown in FIG. 7, at predetermined time intervals. Like the first embodiment, the gas flow rate measured by the gas flow sensor 37 is classified into the three ranges, that is, the ranges 1 through 3. The number of the valves that are set in the open position is then regulated according to the range, so as to vary the amount of the catalyst used for the selective oxidation reaction of carbon monoxide.

Like the first embodiment, the CO selective oxidizing units 34C and 34D of the fourth and the fifth embodiments carry out At the selective oxidation reaction of carbon monoxide at the space velocity that is close to the optimum condition, thereby sufficiently reducing the concentration of carbon monoxide included in the resulting gaseous fuel. The number of cells in the honeycomb tube that receive the supply of the reformed gas, that is, the amount of the catalyst used for the selective oxidation reaction, is varied according to the flow rate of the reformed gas. In case that the amount of the catalyst is greater than the optimum condition, this structure restricts the amount of carbon monoxide evolved by the reverse shift reaction to be within an allowable tracing range. In case that the amount of the catalyst is smaller than the optimum condition, on the other hand, this structure restricts the amount of carbon monoxide that has not been oxidized but remains to be within an allowable tracing range. In the CO selective oxidizing units 34C and 34D of the fourth and the fifth embodiments, the reaction chamber is divided into three sections. The number of division may, however, be decreased to two or increased to four or more.

In the first through the fifth embodiments discussed above, the reaction chamber with the CO selective oxidizing catalyst is dividable, and the area of the reaction chamber used for the selective oxidation reaction of carbon monoxide is varied according to the flow rate of the reformed gas. This structure enables the relationship between the flow rate of the reformed gas and the amount of the catalyst to approach the optimum condition and prevents the concentration of carbon monoxide from increasing due to the insufficient oxidation reaction of carbon monoxide or the progress of the reverse shift reaction. In still another CO selective oxidizing unit 34E given as a sixth embodiment according to the present invention, an increase in concentration of carbon monoxide included in the reformed gas is prevented by regulating the inner temperature of the CO selective oxidizing unit 34E. The CO selective oxidizing unit 34E is incorporated in a fuel-cells system 10E, which has the same structure as that of the fuel-cells system 10 of the first embodiment and is thus not specifically described here. The relationship between the inner temperature of the CO selective oxidizing unit and the concentration of carbon monoxide in the reformed gas is described first, prior to the description of the CO selective oxidizing unit 34E of the sixth embodiment.

Figure 15:
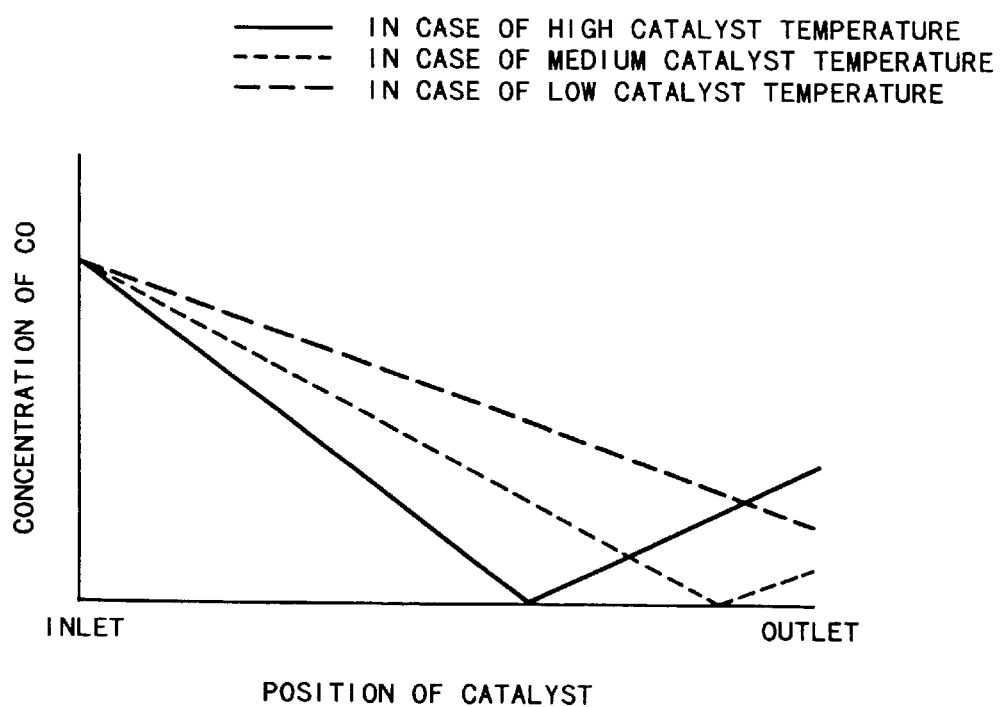
FIG. 15 is a graph showing variations in concentration of carbon monoxide included in the reformed gas passing through a CO selective oxidizing unit at various temperatures of the catalyst.

FIG. 15 shows variations in concentration of carbon monoxide included in a carbon monoxide-containing, hydrogen-rich gas along the direction of a flow of the hydrogen-rich gas. In the CO selective oxidizing unit filled with the platinum-carrying alumina pellets, the hydrogen-rich gas was flown through an inlet, subjected to the selective oxidation reaction for reducing the concentration of carbon monoxide, and discharged from an outlet. The measurement was carried out at the three different temperatures for the selective oxidation reaction of carbon monoxide under the condition of a fixed space velocity. As shown in the graph of FIG. 15, the catalytic function of the CO selective oxidizing catalyst gradually decreases the concentration of carbon monoxide in the hydrogen-rich gas fed to the CO selective oxidizing unit. After the conclusion of the oxidation reaction of carbon monoxide, the concentration of carbon monoxide rises again. The increase in concentration of carbon monoxide is ascribed to the reverse shift reaction expressed by Equation (8) discussed above. The following describes the selective oxidation reaction of carbon monoxide and the reverse shift reaction against the temperature.

Figure 16:
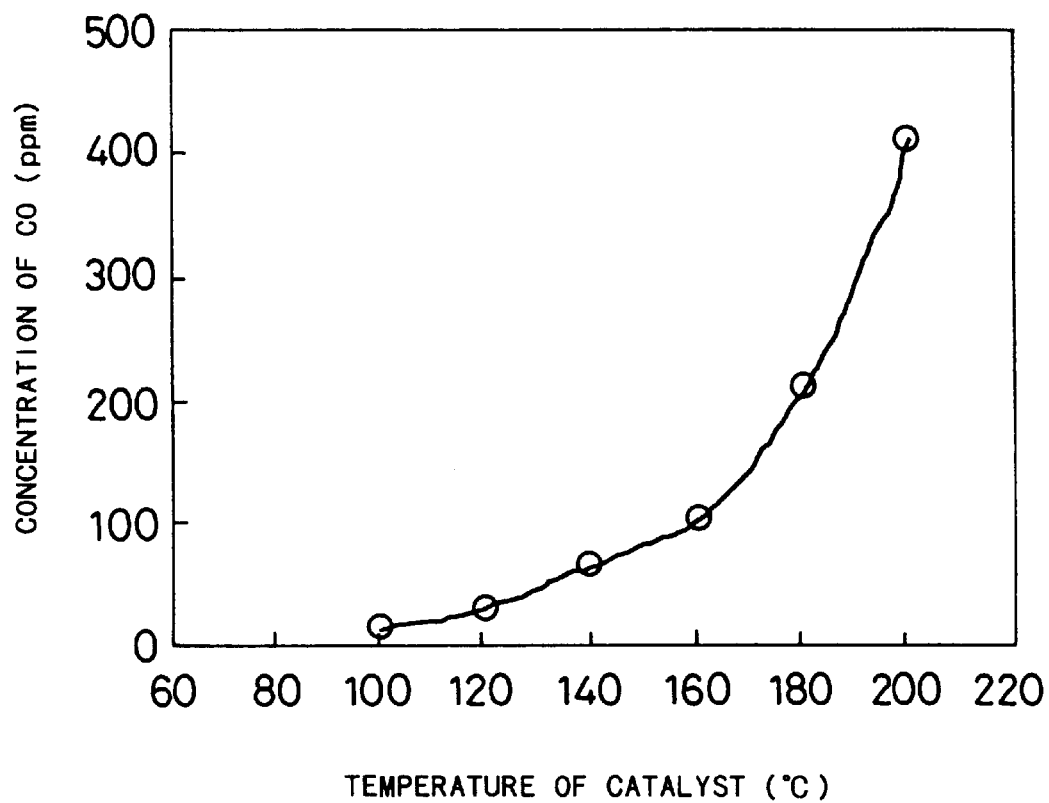
FIG. 16 is a graph showing the relationship between the activity for the reverse shift reaction and the temperature of the catalyst.

A carbon monoxide-free model gas ($H_2$=75%, $CO_2$=25%) was fed to the CO selective oxidizing unit used for the measurement of FIG. 15, and the concentration of carbon monoxide in the gas discharged from the outlet was measured at various temperatures of the catalyst. The graph of FIG. 16 shows the result of measurement. Since the model gas is free of carbon monoxide, it is reasonably assumed that carbon monoxide included in the discharged gas is all ascribed to the reverse shift reaction. In the graph of FIG. 16, the concentration of carbon monoxide in the discharged gas increases with a rise in temperature of the catalyst. This means that the higher temperature accelerates the reverse shift reaction.

Figure 17:
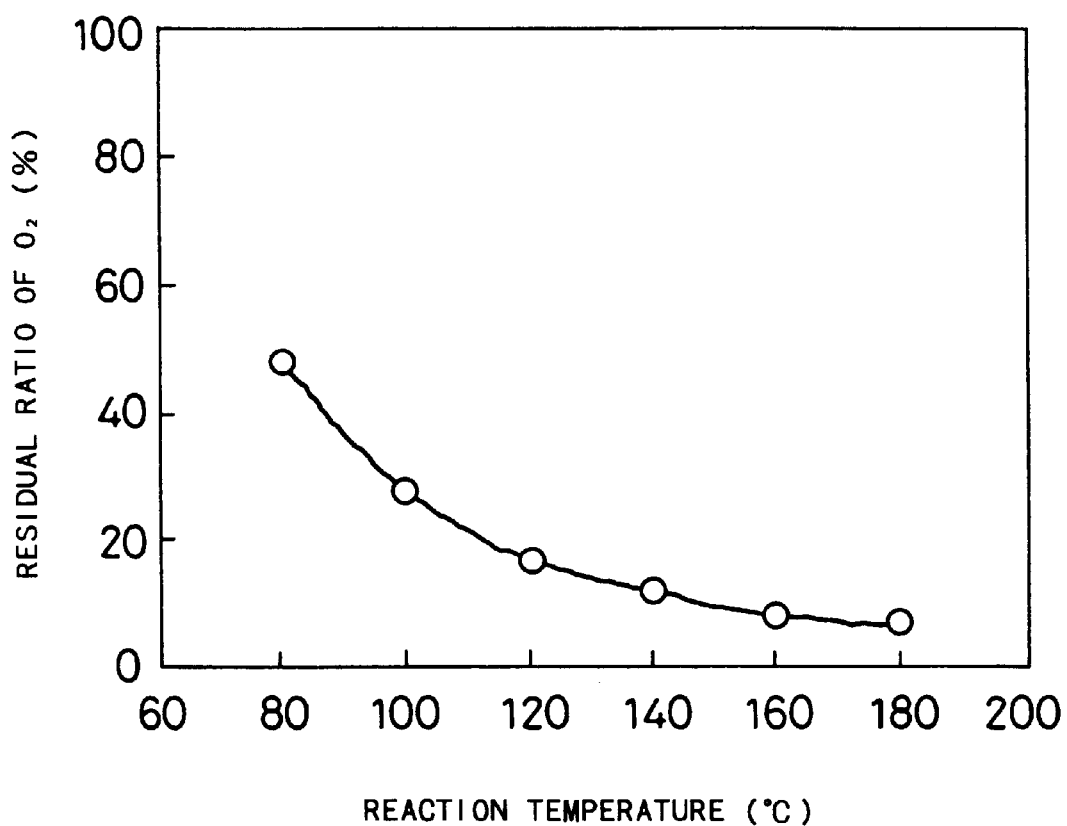
FIG. 17 is a graph showing the relationship between the activity for oxidation and the temperature of the catalyst.

A carbon monoxide-containing model gas (CO=0.5%, $CO_2$=25%, $H_2$=74.5%) was fed to the CO selective oxidizing unit used for the measurement of FIG. 16, and the residual ratio of oxygen in the gas discharged from the outlet was measured at various temperatures of the catalyst. The graph of FIG. 17 shows the result of measurement. The composition of the model gas is substantially identical with the composition of the reformed gas that is obtained through the methanol reforming reaction in a reformer unit, which is equivalent to the reformer unit 32 incorporated in the fuel-cells system 10E. In order to make the conditions of the experiment approach the actual driving state of the fuel-cells system 10E, the model gas was moistened at 60° C. with a bubbler. This made the state of the model gas similar to the state of the reformed gas produced by steam reforming. The model gas was mixed with the air containing a specific amount of oxygen to realize the molar ratio of $[O_2]/[CO]$=3 and subsequently fed to the CO selective oxidizing unit. The residual ratio of oxygen represents the value of [concentration of $O_2$ in discharged gas]/[concentration of $O_2$ in supplied gas]. Oxygen in the supplied gas is mostly used for the oxidation reaction of carbon monoxide. The residual ratio of oxygen accordingly represents the activity for the selective oxidation reaction of carbon monoxide. As shown in the graph of FIG. 17, the residual ratio of oxygen decreases with an increase in temperature of the catalyst. This means that the activity for oxidation of carbon monoxide increases with a rise in temperature.

As discussed above, both the reverse shift reaction and the selective oxidation reaction of carbon monoxide have higher activities at the higher temperature of the catalyst. Under the condition of the normal driving temperature of the CO selective oxidizing unit, the selective oxidation reaction of carbon monoxide has a significantly higher reaction rate than the reverse shift reaction. This leads to the results shown in the graph of FIG. 15. The higher inner temperature of the CO selective oxidizing unit results in earlier conclusion of the selective oxidation reaction of carbon monoxide. After the oxidation reaction of carbon monoxide is concluded and oxygen is used up, the higher inner temperature of the CO selective oxidizing unit accelerates the reverse shift reaction to produce a greater amount of carbon monoxide. Namely the lower inner temperature of the CO selective oxidizing unit shifts the position of conclusion of the oxidation reaction of carbon monoxide toward the outlet, whereas the higher inner temperature shifts the position of conclusion of the oxidation reaction of carbon monoxide toward the inlet.

Figure 18:
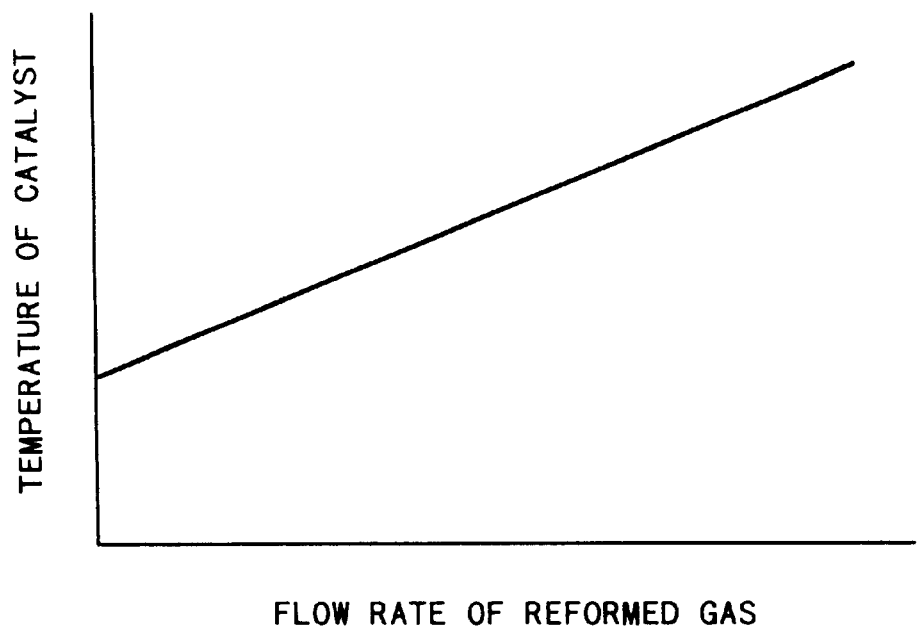
FIG. 18 is a graph showing the temperature of the catalyst plotted against the flow rate of the reformed gas when the lowest concentration of carbon monoxide in the reformed gas is attained in the vicinity of an outlet of the CO selective oxidizing unit.
Figure 19:
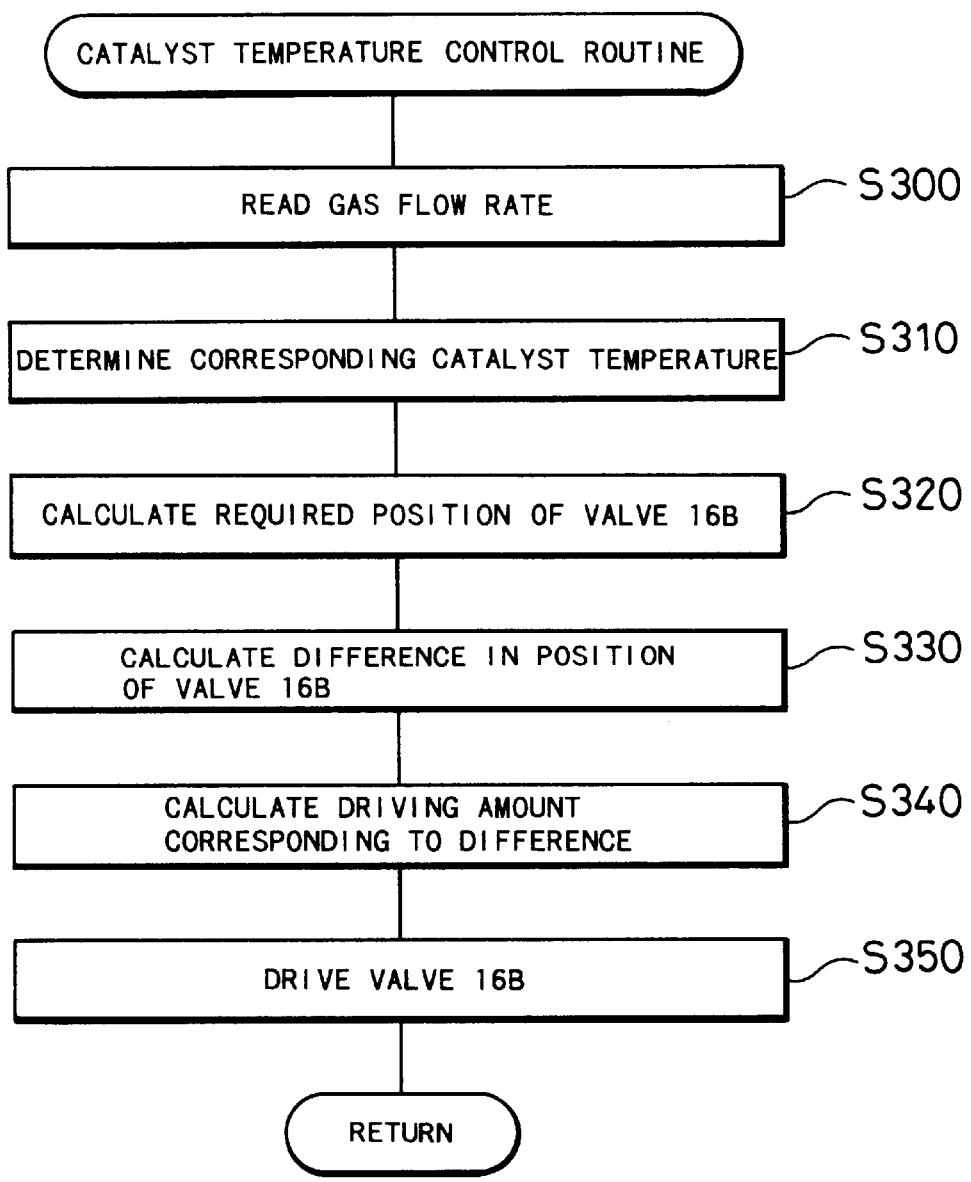
FIG. 19 is a flowchart showing a routine of regulating the temperature of the catalyst in a CO selective oxidizing unit 34E of a sixth embodiment.

The CO selective oxidizing unit 34E of the sixth embodiment takes advantage of the characteristics discussed above. The inner temperature of the CO selective oxidizing unit 34E is regulated according to the supply of the reformed gas, in order to shift the position of conclusion of the oxidation reaction of carbon monoxide toward the outlet. This structure effectively reduces the amount of carbon monoxide remaining without oxidation as well as the amount of carbon monoxide produced by the reverse shift reaction. The carbon monoxide-containing model gas used for the measurement of FIG. 17 was fed to the CO selective oxidizing unit having the same structure as that of the CO selective oxidizing unit 34E of the sixth embodiment. The temperature of the catalyst that set the position of conclusion of the oxidation reaction of carbon monoxide to the outlet of the CO selective oxidizing unit was measured for the various supplies of the reformed gas. The graph of FIG. 18 shows the result of measurement. In the fuel-cells system 10E of the sixth embodiment, the result shown in FIG. 18 is stored in the control unit 70 and used for regulating the inner temperature of the CO selective oxidizing unit 34E according to the flow rate of the reformed gas. The following discusses the process of regulating the inner temperature of the CO selective oxidizing unit 34E. FIG. 19 is a flowchart showing a catalyst temperature control routine carried out to regulate the inner temperature of the CO selective oxidizing unit 34E.

When the fuel reformer 30 of the sixth embodiment starts operation, the control unit 70 carries out the catalyst temperature control routine shown in the flowchart of FIG. 19 at predetermined time intervals, for example, at every 100 msec in this embodiment. The routine regulates the inner temperature of the CO selective oxidizing unit 34E to be suitable for the supply of the reformed gas.

When the program enters the routine of FIG. 19, the CPU 72 first reads a flow rate of the reformed gas measured by the gas flow sensor 37 at step S300 and determines the inner temperature of the CO selective oxidizing unit 34E A corresponding to the input gas flow rate at step S310. As mentioned previously, a map representing the relationship between the gas flow rate and the catalyst temperature as shown in FIG. 18 is stored in advance in the ROM 74. The inner temperature of the CO selective oxidizing unit 34E corresponding to the input gas flow rate is accordingly read from the map.

The CPU 72 subsequently calculates a required position of the valve 16B corresponding to the inner temperature of the CO selective oxidizing unit 34E at step S320. As discussed previously, the inner temperature of the CO selective oxidizing unit 34E depends upon the flow rate of the crude fuel consisting of methanol and water and passing through the first branch path 16. A concrete procedure of step S320 thus determines the position of the valve 16B corresponding to the required flow rate of the crude fuel that makes the inner temperature of the CO selective oxidizing unit 34E equal to the temperature specified at step S310. The CPU 72 then calculates a difference between the required position of the valve 16B obtained at step S320 and the actual position of the valve 16B at step S330, and calculates a driving amount of the valve 16B required for increasing or decreasing the position of the valve 16B by the calculated difference at step S340. At subsequent step S350, the CPU 82 outputs a driving signal, which represents the driving amount calculated at step S340, to the valve 16B. The program then exits from this routine. The actuation of the valve 16B in this manner makes the inner temperature of the CO selective oxidizing unit 34E equal to the suitable temperature specified at step S310.

In the CO selective oxidizing unit 34E of the sixth embodiment, the inner temperature of the CO selective oxidizing unit 34E is regulated according to the flow rate of the reformed gas, in order to enable conclusion of the selective oxidation reaction of carbon monoxide in the vicinity of the outlet of the CO selective oxidizing unit 34E. This structure enables sufficient oxidation reaction of carbon monoxide and depresses the reverse shift reaction, thereby sufficiently reducing the concentration of carbon monoxide included in the resulting gaseous fuel.

The first through the sixth embodiments discussed above regulate either the amount of the CO selective oxidizing catalyst or the temperature of the catalyst based on the flow rate of the reformed gas measured by the gas flow sensor 37.

In the actual state, however, the concentration of carbon monoxide in the discharged gas is affected by not only the flow rate of the supplied gas but the concentration of carbon monoxide in the supplied gas. Namely the absolute amount of carbon monoxide included in the supplied gas determines the optimum amount of the catalyst and the optimum temperature of the catalyst. When a variation in concentration of carbon monoxide included in the reformed gas fed from the reformer unit 32 is expected with a variation in loading under the expected driving conditions of the fuel-cells system, it is desirable to carry out the above control based on the concentration of carbon monoxide in the reformed gas measured by the carbon monoxide sensor 40 as well as on the flow rate of the reformed gas measured by the gas flow sensor 37. In case that the variation in concentration of carbon monoxide in the reformed gas is within an allowable range, the control may be carried out only based on the measured flow rate of the reformed gas.

Figure 20:
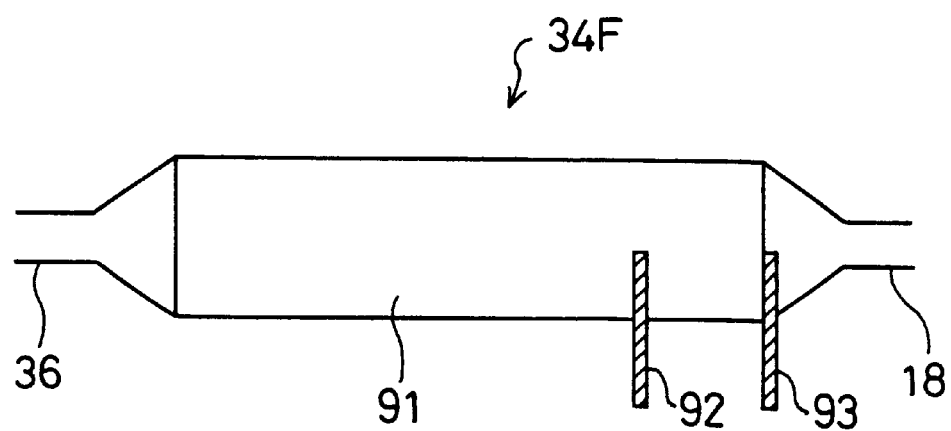
FIG. 20 shows structure of another CO selective oxidizing unit 34F as a seventh embodiment according to the present invention.

In the structure of the sixth embodiment, the inner temperature of the CO selective oxidizing unit 34E is regulated according to the flow rate of the reformed gas. In accordance with another possible application, the inner temperature of the CO selective oxidizing unit may be regulated according to the variation in concentration of carbon monoxide in the CO selective oxidizing unit, instead of the flow rate of the reformed gas. This structure is discussed below as a seventh embodiment according to the present invention. FIG. 20 shows structure of a CO selective oxidizing unit 34F of the seventh embodiment. The CO selective oxidizing unit 34F is incorporated in a fuel-cells system 10F, which has the same structure as that of the fuel-cells system 10 of the first embodiment and is thus not specifically described here.

The CO selective oxidizing unit 34F of the seventh embodiment has a reaction chamber 91 filled with the platinum catalyst-carrying alumina pellets and carbon monoxide sensors 92 and 93 inserted into the reaction chamber 91. The carbon monoxide sensors 92 and 93 have the same structure as that of the carbon monoxide sensor 40 discussed above. The reformed gas passing through the CO selective oxidizing unit 34F is fed to the electrode 42 in each carbon monoxide sensor 92 or 93, and the concentration of carbon monoxide in the reformed gas is measured at the respective positions of the carbon monoxide sensors 92 and 93. The carbon monoxide sensor 93 is positioned at the outlet of the reaction chamber 91, and the carbon monoxide sensor 92 is positioned closer to the inlet of the reaction chamber 91.

The carbon monoxide sensor 93 set at the outlet of the reaction chamber 91 measures the concentration of carbon monoxide included in the gas discharged from the CO selective oxidizing unit 34F. This measurement, however, does not tell whether the high concentration of carbon monoxide in the discharged gas is ascribed to the insufficient oxidation reaction of carbon monoxide or to the reverse shift reaction occurring after conclusion of the oxidation reaction. In the CO selective oxidizing unit 34F of the seventh embodiment, another carbon monoxide sensor 92 is installed at a position other than the outlet of the reaction chamber 91. This configuration determines whether the high concentration of carbon monoxide in the discharged gas should be ascribed to the insufficient oxidation reaction of carbon monoxide or to the reverse shift reaction. In case that the measurement of the carbon monoxide sensor 92 is greater than the measurement of the carbon monoxide sensor 93 at the outlet, that is, when the concentration of carbon monoxide decreases toward the outlet, carbon monoxide in the discharged gas is ascribed to the insufficient oxidation reaction of carbon monoxide. In case that the measurement of the carbon monoxide sensor 92 is smaller than the measurement of the carbon monoxide sensor 93 at the outlet, on the other hand, that is, when the concentration of carbon monoxide increases toward the outlet, carbon monoxide in the discharged gas is ascribed to the reverse shift reaction. In the case of the insufficient oxidation reaction of carbon monoxide, the control increases the temperature in the reaction chamber 91. In the case of the progress of the reverse shift reaction, on the contrary, the control decreases the temperature in the reaction chamber 91. This structure enables an approach to the desired condition that makes conclusion of the oxidation reaction of carbon monoxide at the outlet of the reaction chamber 91.

Figure 21:
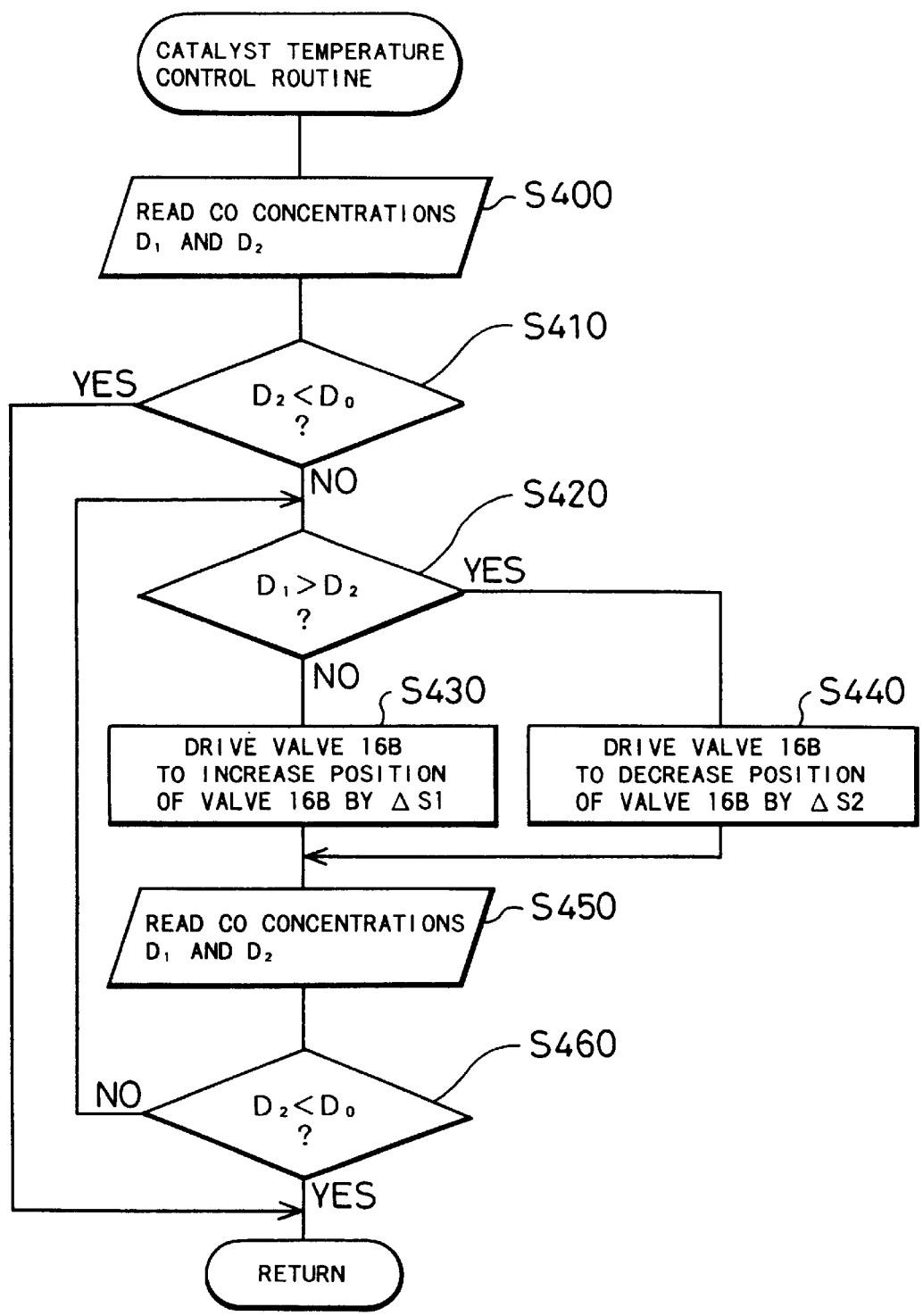
FIG. 21 is a flowchart showing a routine of regulating the temperature of the catalyst in the CO selective oxidizing unit 34F.

The following describes the process of regulating the inner temperature of the CO selective oxidizing unit 34F based on the variation in concentration of carbon monoxide included in the reformed gas passing through the reaction chamber 91. FIG. 21 is a flowchart showing a catalyst temperature control routine carried out to regulate the inner temperature of the CO selective oxidizing unit 34F.

When the fuel reformer 30 of the seventh embodiment starts operation, the control unit 70 carries out the catalyst temperature control routine shown in the flowchart of FIG. 21 at predetermined time intervals, for example, at every 100 msec in this embodiment. The routine regulates the inner temperature of the CO selective oxidizing unit 34F to sufficiently reduce the concentration of carbon monoxide in the reformed gas.

When the program enters the routine of FIG. 21, the CPU 72 first reads concentrations D1 and D2 of carbon monoxide in the reformed gas measured by the carbon monoxide sensors 92 and 93 at step S400. Among the input concentrations of carbon monoxide, the concentration D2 at the outlet of the reaction chamber 91 is compared with a preset reference value D0 at step S410. In case that the input concentration D2 is smaller than the reference value D0, the program determines that the current temperature in the reaction chamber 91 can sufficiently reduce the concentration of carbon monoxide and exits from this routine.

When the input concentration D2 is not smaller than the reference value D0 at step S410, on the contrary, the concentration D2 is further compared with another input concentration D1 at step S420. In case that D1 is greater than D2, the program determines that the oxidation reaction of carbon monoxide in the reaction chamber 91 is insufficient and proceeds to step S440 to output a driving signal to the valve 16B in order to decrease the position of the valve 16B by $\Delta S2$. This procedure decreases the flow rate of the crude fuel circulating through the circumferential portion of the CO selective oxidizing unit 34F for heat exchange, thus increasing the temperature in the reaction chamber 91 by a predetermined amount. In case that D1 is not greater than D2, on the other hand, the program determines that the excess reverse shift reaction occurs in the reaction chamber 91 and proceeds to step S430 to output a driving signal to the valve 16B in order to increase the position of the valve 16B by $\Delta S1$. This procedure increases the flow rate of the crude fuel circulating through the circumferential portion of the CO selective oxidizing unit 34F for heat exchange, thus decreasing the temperature in the reaction chamber 91 by a predetermined amount.

After outputting a driving signal to the valve 16B to increase or decrease the inner temperature of the CO selective oxidizing unit 34F, the CPU 72 again reads the concentrations D1 and D2 of carbon monoxide in the reformed gas measured by the carbon monoxide sensors 92 and 93 at step S450. The input concentration D2 is again compared with the reference value D0 at step S460. In case that the input concentration D2 is smaller than the reference value D0, the program determines that the inner temperature of the reaction chamber 91 is suitable for sufficient reduction of the concentration of carbon monoxide, and exits from this routine.

In case that the input concentration D2 is not smaller than the reference value D0 at step S460, on the other hand, the program returns to step S420 to compare D1 with D2 and outputs a driving signal to the valve 16B based on the result of comparison, in order to make the concentration D2 smaller than the reference value D0.

As discussed above, the position of the valve 16B is increased by ΔS1 or decreased by ΔS2 to vary the inner temperature of the reaction chamber 91. These values ΔS1 and ΔS2 are determined by taking into account a delay between a change in flow rate of the crude fuel and an actual variation in inner temperature of the reaction chamber 91, based on the response of the inner temperature of the reaction chamber 91 against the change in flow rate of the crude fuel. In this embodiment, the values ΔS1 and ΔS2 are set to enable an increase or decrease in position of the valve 16B by ΔS1 or by ΔS2 to decrease or increase the inner temperature of the reaction chamber 91 by approximately 50° C.

In the CO selective oxidizing unit 34F of the seventh embodiment, when the concentration of carbon monoxide in the gas discharged from the CO selective oxidizing unit 34F is not sufficiently reduced, the inner temperature of the CO selective oxidizing unit 34F is regulated according to the variation in concentration of carbon monoxide in the reaction chamber 91. This structure quickly controls the inner temperature of the CO selective oxidizing unit 34F to a desired level and enables conclusion of the oxidation reaction of carbon monoxide in the vicinity of the outlet of the reaction chamber 91. The structure of the seventh embodiment thus significantly reduces the concentration of carbon monoxide in the gas discharged from the CO selective oxidizing unit 34F.

In the CO selective oxidizing unit 34F of the seventh embodiment, the carbon monoxide sensors are installed at the outlet and the upstream position of the reaction chamber. In accordance with one possible application, a plurality of carbon monoxide sensors may be installed at other positions. Measurement of the concentration of carbon monoxide at a plurality of arbitrary positions gives the slope of a variation in concentration of carbon monoxide in the reaction chamber. This enables estimation of the concentration of carbon monoxide at the outlet as well as the reducing state of carbon monoxide. Like the structure of the seventh embodiment, this structure also enables the temperature control of the CO selective oxidizing unit based on the result of estimation. The structure of the seventh embodiment having one carbon monoxide sensor positioned at the outlet of the reaction chamber directly shows the concentration of carbon monoxide in the gas discharged from the CO selective oxidizing unit, thus allowing the control with higher accuracy.

In the CO selective oxidizing units of the first through the seventh embodiments, platinum is used as the CO selective oxidizing catalyst. Other catalysts may be applicable as long as they have sufficient catalytic activity for selective oxidation of carbon monoxide. Available metals other than platinum include ruthenium, palladium, rhodium, gold, copper, and nickel. One or a plurality of metals may be selected among these options and supported on a predetermined support. Examples of the available support other than alumina used in the above embodiments include zirconia, iron oxides, zinc oxide, titanium oxides, cobalt oxides, zeolites, silicon oxides, tin oxides, and magnesium oxide. One or a combination of these oxides may be used as the support. The suitable reaction temperature is determined according to the selected combination of the metal catalyst and the support.

In the first through the seventh embodiments discussed above, the control procedure regulates the amount of the catalyst or the temperature of the catalyst, in order to enable conclusion of the selective oxidation reaction of carbon monoxide in the vicinity of the outlet of the CO selective oxidizing unit and depress the progress of the reverse shift reaction. Another possible structure consumes carbon monoxide produced through the reverse shift reaction, so as to reduce the concentration of carbon monoxide included in the reformed gas discharged from the fuel reformer 30. A structure discussed below as an eighth embodiment according to the present invention methanizes carbon monoxide included in the reformed gas in order to reduce the concentration of carbon monoxide in the reformed gas.

Figure 22:
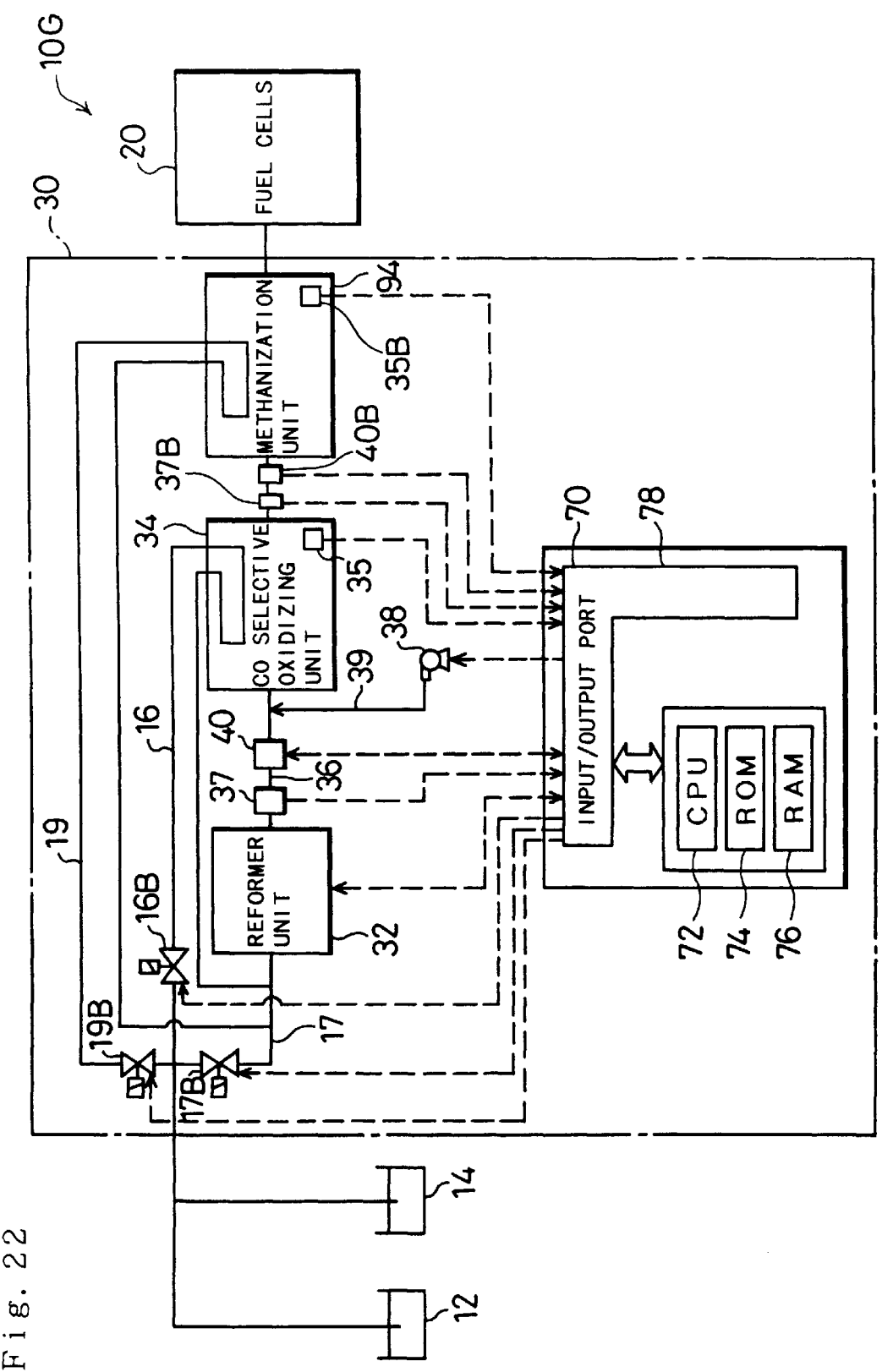
FIG. 22 is a block diagram illustrating structure of another fuel-cells system 10G as an eighth embodiment according to the present invention.

FIG. 22 is a block diagram illustrating structure of a fuel-cells system 10G of the eighth embodiment. The fuel-cells system 10G has a methanization unit 94 arranged down the CO selective oxidizing unit 34, in addition to the constituents of the fuel-cells system 10 of the first embodiment. The methanization unit 94 is filled with alumina pellets having a methanization catalyst, for example, a ruthenium catalyst, supported thereon. In the fuel-cells system 10G of the eighth embodiment, the reformed gas discharged from the CO selective oxidizing unit 34 is subjected to the methanization reaction of carbon monoxide in the methanization unit 94, before being supplied as the gaseous fuel to the fuel cells 20. A gas flow sensor 37B and a carbon monoxide sensor 40B are disposed in the middle of a flow path for feeding the reformed gas from the CO selective oxidizing unit 34 to the methanization unit 94. These sensors 37B and 40B have the same structures as those of the gas flow sensor 37 and the carbon monoxide sensor 40 arranged up the CO selective oxidizing unit 34, and output detection signals to the control unit 70.

Like the CO selective oxidizing unit 34, the methanization unit 94 has a flow path in a circumferential portion thereof, through which the crude fuel consisting of methanol and water flows. The flow path is part of a second branch path 19. The crude fuel supply conduit 17 branches off to the second branch path 19 at the same position as branching off to the first branch path 16. The methanization reaction of carbon monoxide proceeding in the methanization unit 94 is exothermic. Like in the CO selective oxidizing unit 34, circulation of the crude fuel in the methanization unit 94 cools down the methanization unit 94 and keeps the inner temperature of the methanization unit 94 within an effective temperature range suitable for the methanization reaction. The second branch path 19 branching off from the crude fuel supply conduit 17 is provided with a valve 19B. Control of the position of the valve 19B varies the flow rate of the crude fuel, thus regulating the inner temperature of the methanization unit 94.

The methanization reaction expressed by Equation (9) below proceeds in the methanization unit 94 to methanize carbon monoxide:

$$CO + 3H_2 \rightarrow CH_4 + H_2O \tag{9}$$

Figure 23:
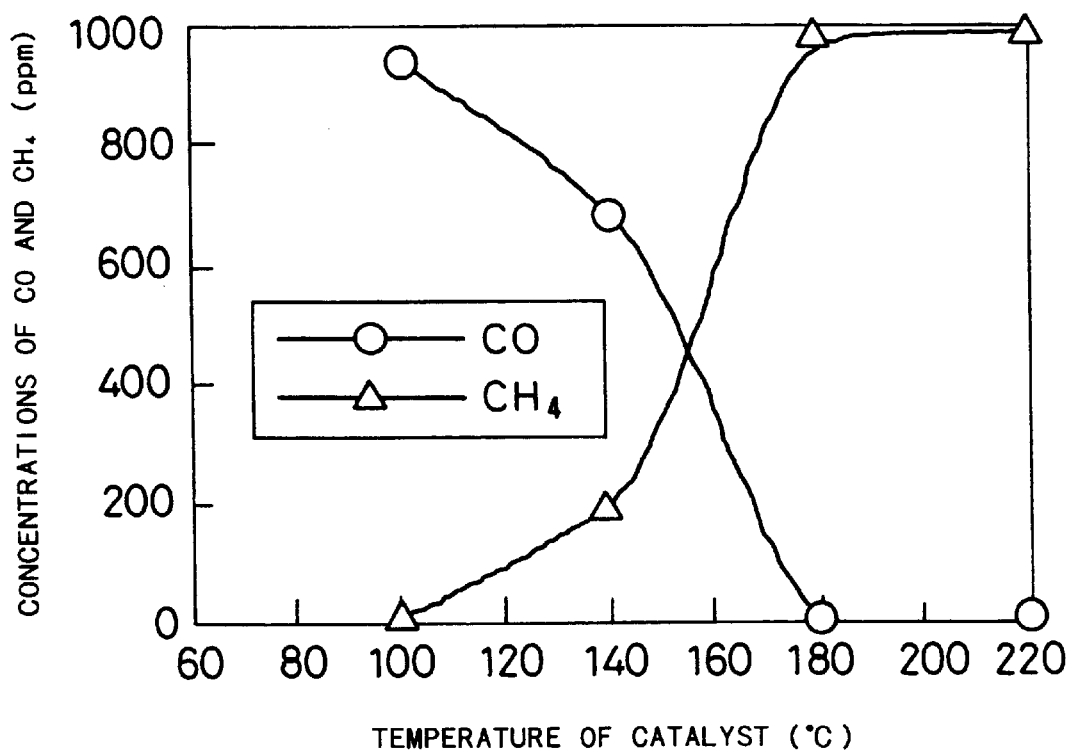
FIG. 23 is a graph showing the relationship between the methanization activity of the ruthenium catalyst and the temperature of the catalyst.

The graph of FIG. 23 shows the relationship between the methanization reaction and the temperature measured with a model gas. A model gas (concentration of CO in $H_2$ gas= 1000 ppm) was fed at a space velocity of 5000 $h^{-1}$ to a methanization unit (volume of catalyst=10 ml) having the same structure as that of the methanization unit 94, and the concentration of carbon monoxide and the concentration of methane included in the gas discharged from the methanization unit were measured for various temperatures of the catalyst. The result shows that the activity for the methanization reaction expressed by Equation (9) increases with a rise in temperature of the catalyst. In the actual methanization unit 94, the methanization reaction of carbon dioxide expressed by Equation (10) given below proceeds, in addition to the methanization reaction of carbon monoxide expressed by Equation (9):

$$CO_2 + 4H_2 \rightarrow CH_4 + 2H_2O \qquad (10)$$

Figure 24:
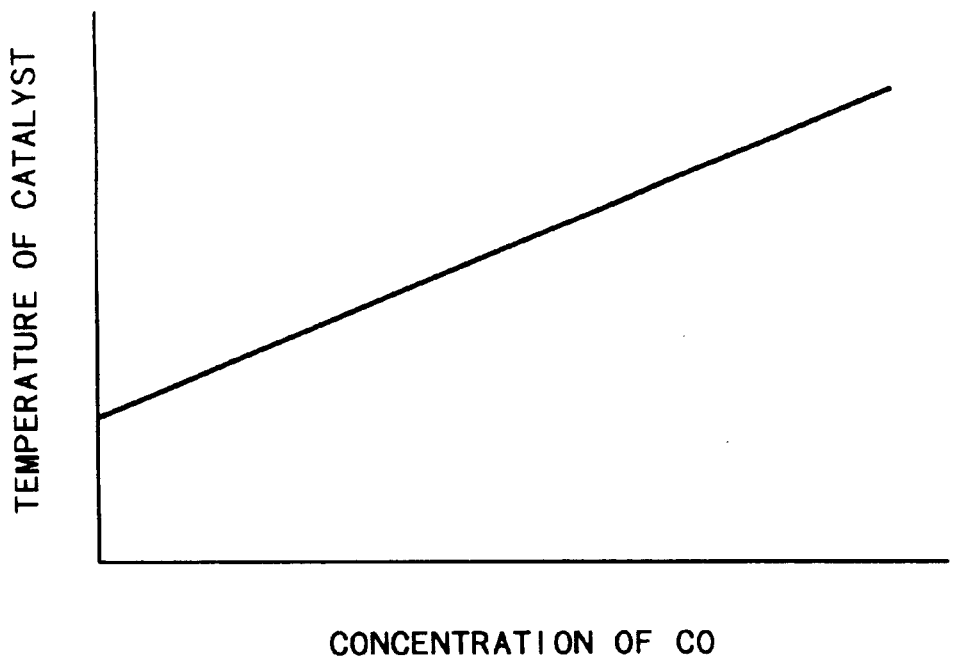
FIG. 24 is a graph showing the relationship between the concentration of carbon monoxide included in the gas fed to the methanization unit 94 of the eighth embodiment and the minimum temperature of the catalyst for sufficiently methanizing carbon monoxide in the gas.

The activity for the methanization reaction of carbon dioxide also increases with a rise in temperature of the catalyst. These methanization reactions consume hydrogen in the reformed gas simultaneously with production of methane. In order to prevent a decrease in hydrogen partial pressure of the gaseous fuel fed to the fuel cells 20, it is desirable to set the temperature of the methanization catalyst as low as possible in a specific range that enables sufficient methanization of carbon monoxide. The graph of FIG. 24 shows the critical value (optimum value) of the catalyst temperature, which enables sufficient methanization of carbon monoxide but restricts a decrease in hydrogen partial pressure within an allowable range, plotted against the concentration of carbon monoxide varied in a predetermined range. In the fuel-cells system 10G of the eighth embodiment, a map shown in FIG. 24 is stored in the control unit 70. In the actual state, the optimum value of the catalyst temperature depends upon not only the concentration of carbon monoxide in the reformed gas but the flow rate of the reformed gas. The map stored in the control unit 70 accordingly represents the curve of optimum value of the catalyst temperature over the whole range of the concentration of carbon monoxide in the reformed gas and the flow rate of the reformed gas under the expected driving conditions. The inner temperature of the methanization unit 94 is controlled, based on the detection signals input from the gas flow sensor 37B and the carbon monoxide sensor 40B and the map representing the optimum value of the catalyst temperature.

The optimum temperature range for the selective oxidation reaction of carbon monoxide in the CO selective oxidizing unit 34 filled with the platinum catalyst is 100 to 160° C. This temperature range is included in the temperature range of FIG. 23, in which the methanization catalyst functions effectively. The simple circulation of the crude fuel through the methanization unit 94, in which the exothermic reaction proceeds, for heat exchange thus enables effective temperature control. The flow rate of the crude fuel is increased to lower the inner temperature of the methanization unit 94. The flow rate of the crude fuel is decreased, on the other hand, to raise the inner temperature of the methanization unit 94 by utilizing the heat produced through the exothermic methanization reaction.

Figure 25:
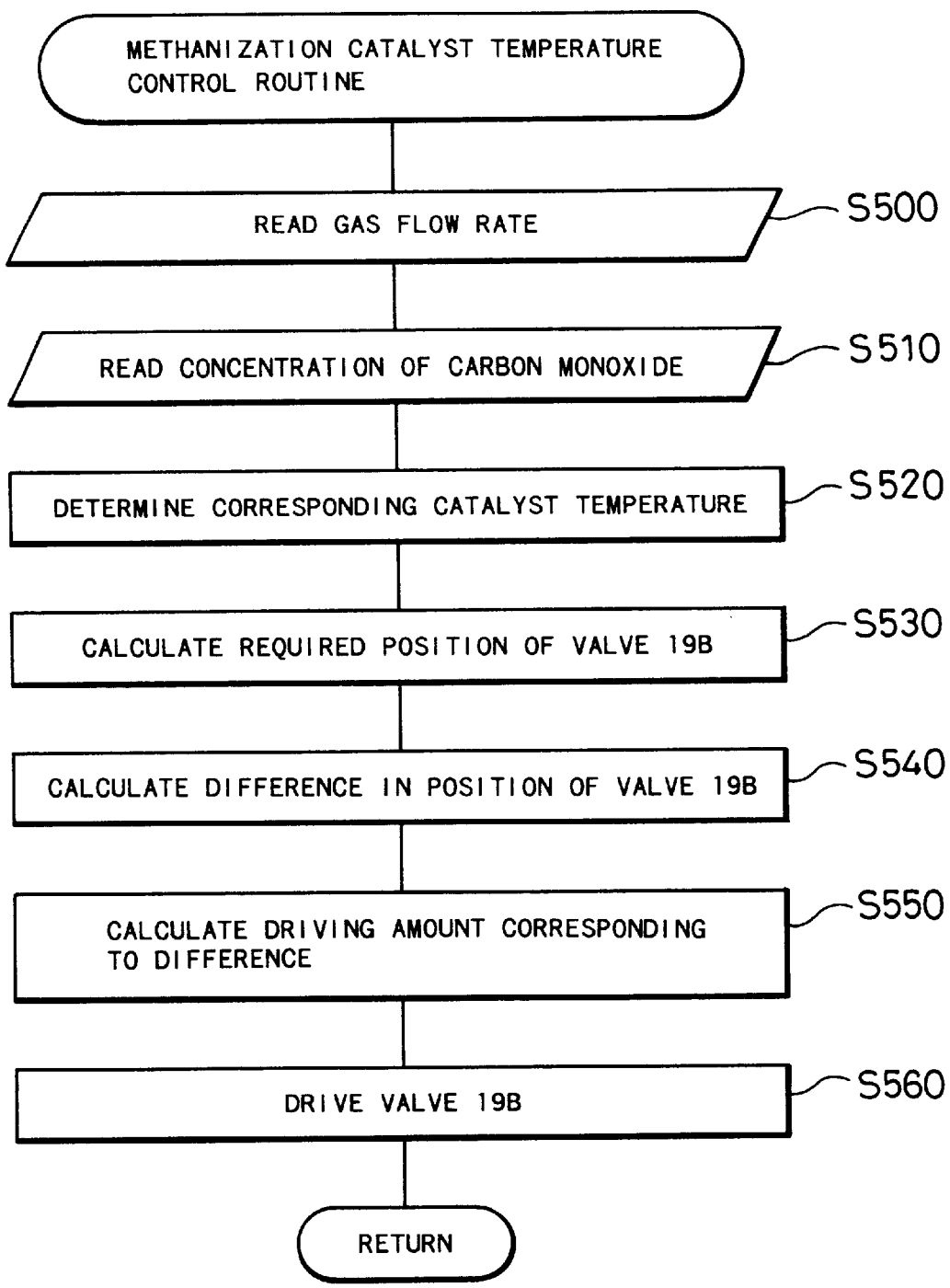
FIG. 25 is a flowchart showing a routine of regulating the temperature of the catalyst in the methanization unit 94.

The following describes the process of regulating the inner temperature of the methanization unit 94. FIG. 25 is a flowchart showing a methanization catalyst temperature control routine carried out to regulate the inner temperature of the methanization unit 94.

When the fuel reformer 30 of the eighth embodiment starts operation, the control unit 70 carries out the methanization catalyst temperature control routine shown in the flowchart of FIG. 25 at predetermined time intervals, for example, at every 100 msec in this embodiment. The routine regulates the inner temperature of the methanization unit 94 to be suitable for the supply of the reformed gas and the concentration of carbon monoxide in the reformed gas.

When the program enters the routine of FIG. 25, the CPU 72 first reads a flow rate of the reformed gas measured by the gas flow sensor 37B at step S500 and reads a concentration of carbon monoxide in the reformed gas measured by the carbon monoxide sensor 40B at step S510. The CPU 72 then determines the inner temperature of the methanization unit 94 corresponding to the input gas flow rate and the input concentration of carbon monoxide at step S520. As mentioned above, the curve of optimum value of the catalyst temperature over the whole range of the concentration of carbon monoxide in the reformed gas and the flow rate of the reformed gas is stored in advance as a map in the ROM 74. The inner temperature of the methanization unit 94 corresponding to the input data is accordingly read from the map.

At subsequent step S530, the CPU 72 calculates a required position of the valve 19B to realize the inner temperature of the methanization unit 94 specified at step S520. As discussed previously, the inner temperature of the methanization unit 94 depends upon the flow rate of the crude fuel consisting of methanol and water and passing through the second branch path 19. A concrete procedure of step S530 thus determines the position of the valve 19B corresponding to the required flow rate of the crude fuel that makes the inner temperature of the methanization unit 94 equal to the temperature specified at step S520. The program then proceeds to step S540 to calculate a difference between the actual position of the valve 19B and the required position of the valve 19B obtained at step S530. The CPU 72 then calculates a driving amount of the valve 19B required for increasing or decreasing the position of the valve 19B by the calculated difference at step S550. At subsequent step S560, the CPU 72 outputs a driving signal, which represents the driving amount calculated at step S550, to the valve 19B. The program then exits from this routine. The actuation of the valve 19B in this manner makes the inner temperature of the methanization unit 94 equal to the suitable temperature specified at step S520.

In the fuel-cells system 10G of the eighth embodiment, the reformed gas containing the reduced concentration of carbon monoxide is fed from the CO selective oxidizing unit 34 to the methanization unit 94, which methanizes carbon monoxide remaining in the reformed gas and feeds the gaseous fuel containing an extremely low concentration of carbon monoxide to the fuel cells 20. Even when the CO selective oxidizing unit can not sufficiently lower the concentration of carbon monoxide in the reformed gas due to the insufficient oxidation reaction of carbon monoxide or the excess progress of the reverse shift reaction, the methanization unit sufficiently reduces the concentration of carbon monoxide in the resulting gaseous fuel. In the structure of the eighth embodiment, the methanization unit 94 is separate from the CO selective oxidizing unit 34. This structure enables the CO selective oxidizing unit 34 and A the methanization unit 94 to be controlled to the respective optimum temperatures, thereby realizing the selective oxidation reaction of carbon monoxide and the methanization reaction at extremely high efficiencies.

In the eighth embodiment, the methanization catalyst, that is, the ruthenium catalyst, is supported on the alumina pellets. The methanization catalyst may alternatively be supported on the surface of a base member, such as a honeycomb tube. Although the CO selective oxidizing unit 34 of the first embodiment is incorporated in the fuel-cells system 10G of this embodiment, any one of the CO selective oxidizing units of the second through the seventh embodiments may be used instead.

Figure 26:
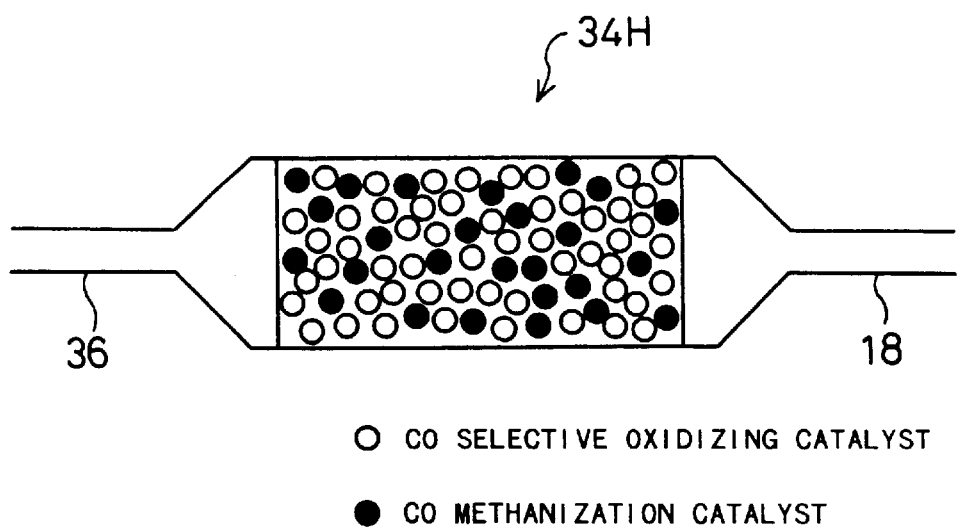
FIG. 26 shows structure of another CO selective oxidizing unit 34H as a ninth embodiment according to the present invention.

In the fuel-cells system 10G of the eighth embodiment, the methanization unit 94 is arranged after the CO selective oxidizing unit 34. Another possible structure may carry out the methanization reaction of carbon monoxide simultaneously with the selective oxidation reaction of carbon monoxide. Such a structure is discussed below as a ninth embodiment according to the present invention. FIG. 26 shows structure of a CO selective oxidizing unit 34H of the ninth embodiment. The CO selective oxidizing unit 34H is filled with the alumina pellets having the CO selective oxidizing catalyst, for example, the platinum catalyst, supported thereon as well as with the alumina pellets having the methanization catalyst, for example, the ruthenium catalyst, supported thereon. The CO selective oxidizing unit 34H is incorporated in a fuel-cells system 10H, which has the same structure as that of the fuel-cells system 10 of the first embodiment and is thus not specifically described here.

As discussed previously, the methanization catalyst, that is, ruthenium, shows the effective methanization activity at the temperatures of not lower than 100° C., whereas the optimum temperature of the CO selective oxidizing catalyst, that is, platinum, ranges from 100 to 160° C. Only the temperature control for the selective oxidation reaction of carbon monoxide carried out in the structure of the sixth embodiment enables the methanization reaction to simultaneously proceed in the CO selective oxidizing unit 34H at a sufficient efficiency. Like in the CO selective oxidizing unit 34E of the sixth embodiment, in the CO selective oxidizing unit 34H of the ninth embodiment, the temperature of the CO selective oxidizing catalyst, that is, the inner temperature of the CO selective oxidizing unit 34H, is determined according to the flow rate of the reformed gas. As discussed in the first through the fifth embodiments, the reaction chamber of the CO selective oxidizing unit may be divided into a plurality of sections, and the amount of the CO selective oxidizing catalyst mixed with the methanization catalyst may be regulated, for example, according to the flow rate of the reformed gas. When the reaction chamber is made of a honeycomb tube as discussed in the third through the fifth embodiments, platinum and ruthenium are supported at a predetermined proportion on the surface of the honeycomb tube in the CO selective oxidizing unit 34H.

The CO selective oxidizing unit 34H of the ninth embodiment carries out the methanization reaction of carbon monoxide simultaneously with the selective oxidation reaction of carbon monoxide. This structure further reduces the concentration of carbon monoxide through the methanization reaction, so that the resulting gaseous fuel has an extremely low concentration of carbon monoxide.

Figure 27:
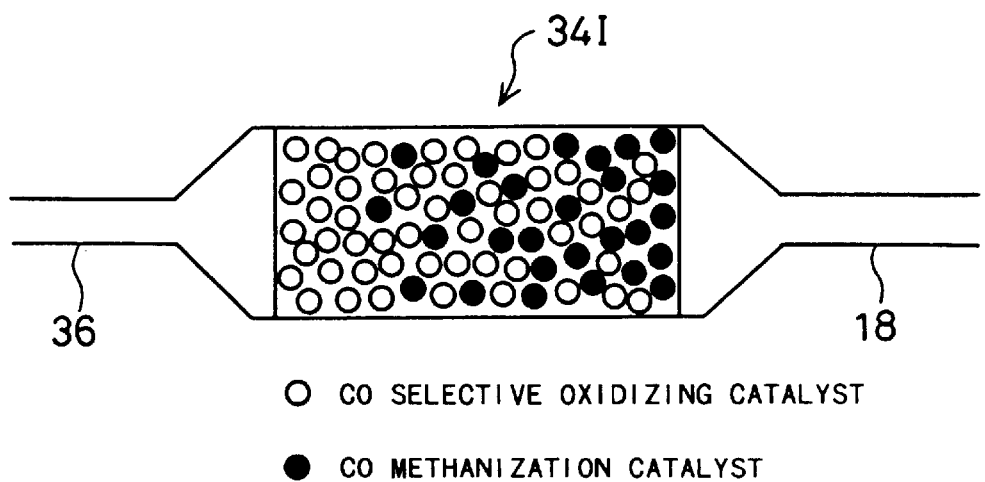
FIG. 27 shows structure of still another CO selective oxidizing unit 34I as a modification of the ninth embodiment.

In the CO selective oxidizing unit 34H shown in FIG. 26, the CO selective oxidizing catalyst and the methanization catalyst are mixed homogeneously. In accordance with another preferable structure, the proportion of the methanization catalyst is heightened at the outlet of the CO selective oxidizing unit. FIG. 27 shows a CO selective oxidizing unit 34I of this structure. The CO selective oxidizing unit 34I is filled with the alumina pellets having the platinum catalyst supported thereon as well as with the alumina pellets having the ruthenium catalyst supported thereon like the CO selective oxidizing unit 34H, but the proportion of the alumina pellets with the ruthenium catalyst supported thereon increases toward the outlet of the CO selective oxidizing unit 34I.

The CO selective oxidizing unit 34I has only one reaction chamber filled with the pellets having the catalysts supported thereon. As discussed in the first through the fifth embodiments, the reaction chamber of the CO selective oxidizing unit may be divided into a plurality of sections, and the proportion of the methanization catalyst may be heightened at the outlet of each reaction chamber. When the reaction chamber is made of a honeycomb tube as discussed in the third through the fifth embodiments, the proportion of ruthenium to platinum is heightened on the surface of the honeycomb tube in the vicinity of the outlet thereof.

This structure effectively consumes carbon monoxide that is left by the insufficient selective oxidation reaction of carbon monoxide or is produced by the reverse shift reaction proceeding after the conclusion of the selective oxidation reaction of carbon monoxide. In the CO selective oxidizing unit 34I, the proportion of the methanization catalyst increases toward the outlet of the reaction chamber. In the area where the selective oxidation reaction of carbon monoxide sufficiently proceeds, this structure restricts the activity for the methanization reaction and thereby limits the amount of hydrogen consumed by the methanization reaction.

Although ruthenium is used as the methanization catalyst in the eighth and the ninth embodiments discussed above, another catalyst, such as nickel, may be applied for the methanization catalyst. As mentioned above, the CO selective oxidizing catalyst is also not limited to platinum. In accordance with another preferable structure, one catalyst has both the activities for selective oxidation of carbon monoxide and methanization of carbon monoxide and can accelerate the selective oxidation reaction of carbon monoxide simultaneously with the methanization reaction of carbon monoxide. This structure is discussed below as a tenth embodiment according to the present invention.

Figure 28:
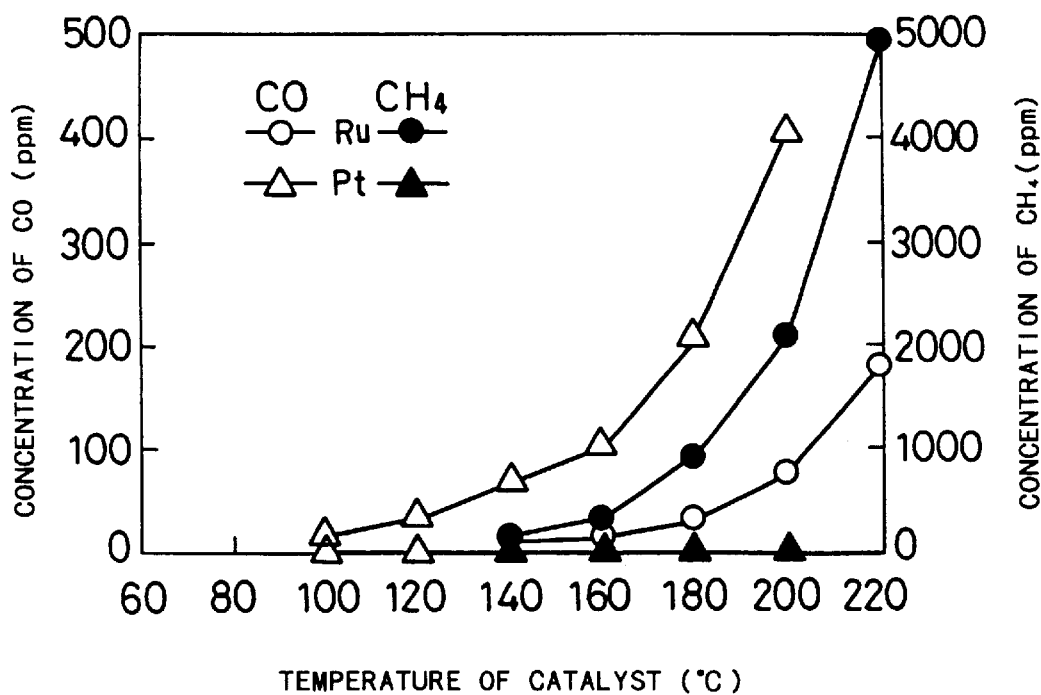
FIG. 28 is a graph showing the activities of the catalyst for the reverse shift reaction and the methanization reaction plotted against the temperature of the catalyst.

A CO selective oxidizing unit 34J of the tenth embodiment is filled with alumina pellets having the ruthenium catalyst supported thereon and is incorporated in a fuel-cells system 10J, which has the same structure as that of the fuel-cells system 10 of the first embodiment. The ruthenium catalyst has both the activities for selective oxidation of carbon monoxide and methanization of carbon monoxide. The following describes the characteristics of the ruthenium catalyst. The graph of FIG. 28 shows the comparison in activities for oxidation of carbon monoxide and methanization of carbon monoxide between the ruthenium catalyst and the platinum catalyst. Like the CO selective oxidizing unit 34J of the tenth embodiment, CO selective oxidizing units of 10 ml in volume were respectively filled with alumina pellets having the ruthenium catalyst and the platinum catalyst. A model gas ($H_2$=75%, $CO_2$=25%) moistened at 60° C. with a bubbler was fed at a space velocity of 5000 $h^{-1}$ to the respective CO selective oxidizing units, and the concentrations of carbon monoxide and methane in the discharged gas were measured.

As shown in the graph of FIG. 28, in both the cases of the ruthenium catalyst and the platinum catalyst, the concentration of carbon monoxide in the discharged gas increases with a rise in temperature of the catalyst, which proves the progress of the reverse shift reaction. The ruthenium catalyst, however, leads to a less amount of carbon monoxide. In the case of the ruthenium catalyst, the concentration of methane in the discharged gas also increases with a rise in temperature of the catalyst, which proves the progress of the methanization reaction. No production of methane is observed in the case of the platinum catalyst. These results show that the ruthenium catalyst methanizes carbon monoxide produced by the reverse shift reaction and thereby reduces the concentration of carbon monoxide. The CO selective oxidizing unit 34J of the tenth embodiment filled with the ruthenium catalyst thus methanizes carbon monoxide produced by the reverse shift reaction simultaneously with selective oxidation of carbon monoxide in the reformed gas, thus reducing the concentration of carbon monoxide in the resulting gaseous fuel.

As discussed above, the CO selective oxidizing unit 34J including only one catalyst can carry out methanization of carbon monoxide simultaneously with selective oxidation of carbon monoxide in the reformed gas, so that the resulting gaseous fuel has an extremely low concentration of carbon monoxide. The catalyst used here has both the oxidation activity and the methanization activity and enables carbon monoxide in the reformed gas to be subjected to both the oxidation reaction and the methanization reaction, thereby effectively reducing the concentration of carbon monoxide in the reformed gas. Even when the selective oxidation reaction of carbon monoxide is concluded before the outlet of the CO selective oxidizing unit, the methanization reaction consumes carbon monoxide produced by the subsequently proceeding reverse shift reaction, so that the resulting gaseous fuel discharged from the CO selective oxidizing unit has an extremely low concentration of carbon monoxide.

The catalyst that has the activities for both selective oxidation and methanization of carbon monoxide and is used in the CO selective oxidizing unit 34J of the tenth embodiment may be applied for the CO selective oxidizing units of the first through the fifth embodiments. Other structures having a plurality of reaction chambers filled with the catalyst-carrying pellets or having a reaction chamber made of a honeycomb tube exert the same effects as those of the tenth embodiment.

The ruthenium catalyst is used in the CO selective oxidizing unit 34J of the tenth embodiment. Other catalysts, such as a nickel catalyst, may, however, be used instead of the ruthenium catalyst, as long as they have activities for both selective oxidation and methanization of carbon monoxide. The favorable temperature range of the ruthenium catalyst is 100 to 180° C., which is close to the favorable temperature range of the reforming reaction in the reformer unit and the favorable temperature range of the cell reactions in the fuel cells. The ruthenium catalyst used as the CO selective oxidizing catalyst having the methanization activity advantageously simplifies the structure for temperature control of the reformed gas and the gaseous fuel.

The fuel reformers of the eighth through the tenth embodiments discussed above use the catalyst having the methanization activity, which accelerates the methanization reaction to consume carbon monoxide produced by the reverse shift reaction. Another possible structure carries out the oxidation reaction to consume carbon monoxide produced by the reverse shift reaction. In this case, the amount of the oxidizing gas, which contains oxygen required for the oxidation reaction and is introduced into the reformed gas fed to the CO selective oxidizing unit, is determined by taking into account the amount of carbon monoxide included in the reformed gas as well as the amount of carbon monoxide produced by the reverse shift reaction proceeding in the CO selective oxidizing unit. A CO selective oxidizing unit 34K of such a structure is discussed below as an eleventh embodiment according to the present invention.

Figure 29:
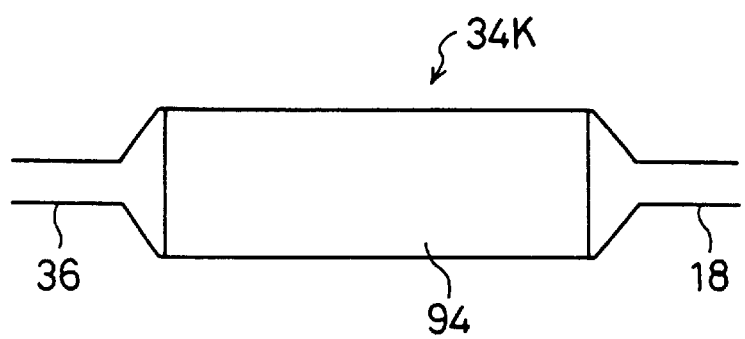
FIG. 29 shows structure of still another CO selective oxidizing unit 34K as an eleventh embodiment according to the present invention.

The CO selective oxidizing unit 34K of the eleventh embodiment is incorporated in a fuel-cells system 10K, which has the same structure as that of the fuel-cells system 10 of the first embodiment and is thus not specifically described here. As shown in FIG. 29, the CO selective oxidizing unit 34K has a reaction chamber 94 filled with the platinum catalyst-carrying alumina pellets. The following describes the relationship between carbon monoxide and oxygen in the CO selective oxidizing unit 34K, prior to the control procedure in the CO selective oxidizing unit 34K. The reverse shift reaction as well as the selective oxidation reaction of carbon monoxide proceeds in the CO selective oxidizing unit 34K. As mentioned previously, since the selective oxidation reaction of carbon monoxide has a higher reaction rate than that of the reverse shift reaction, the concentration of carbon monoxide decreases until oxygen is used up. The reverse shift reaction, which proceeds after oxygen is used up and the selective oxidation reaction of carbon monoxide is concluded, produces carbon monoxide remaining in the gas discharged from the CO selective oxidizing unit. In the case of an excess supply of oxygen to the reformed gas fed to the CO selective oxidizing unit, carbon monoxide produced by the reverse shift reaction proceeding in the CO selective oxidizing unit can be oxidized completely. In the CO selective oxidizing unit 34K of the eleventh embodiment, the amount of oxygen (the amount of the oxidizing gas) introduced into the reformed gas is regulated according to the flow rate of the reformed gas, in order to oxidize carbon monoxide originally included in the reformed gas as well as carbon monoxide produced by the reverse shift reaction, thereby reducing the concentration of carbon monoxide in the resultant discharged gas.

Excess amounts of hydrogen and carbon monoxide involved in the reverse shift reaction exist in the reformed gas fed to the CO selective oxidizing unit. The reverse shift reaction accordingly has a fixed rate at a constant temperature. An increase in amount of oxygen introduced into the reformed gas fed to the CO selective oxidizing unit accelerates the oxidation reaction of hydrogen in the reformed gas and leads to consumption of oxygen for oxidation of hydrogen. The activity for selective oxidation of carbon monoxide gradually decreases with a decrease in concentration of oxygen in the reformed gas in the CO selective oxidizing unit. There are various factors affecting the concentration of carbon monoxide in the reformed gas passing through the CO selective oxidizing unit. The minimum amount of oxygen that makes the concentration of carbon monoxide substantially equal to zero at the outlet of the CO selective oxidizing unit can be determined as a reproducible value according to the flow rate of the reformed gas fed to the CO selective oxidizing unit. In the CO selective oxidizing unit 34K of the eleventh embodiment, the relationship between the flow rate of the reformed gas and the minimum amount of the oxidizing gas required for sufficiently reducing the concentration of carbon monoxide is stored in the control unit 70. The structure of the eleventh embodiment determines the amount of the oxidizing gas introduced into the reformed gas, based on this relationship, so as to reduce the concentration of carbon monoxide in the reformed gas.

Figure 30:
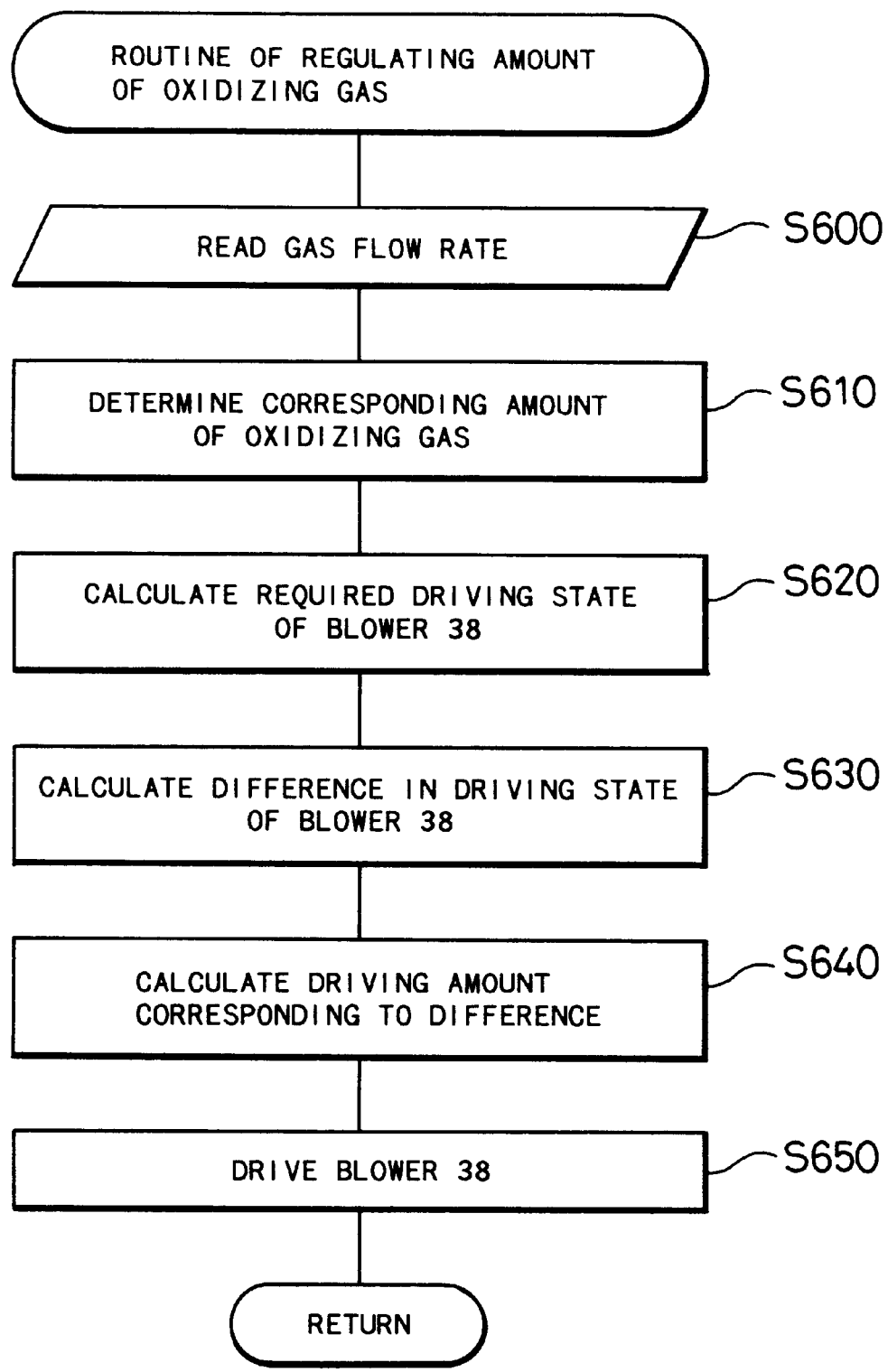
FIG. 30 is a flowchart showing a routine of regulating the amount of the oxidizing gas introduced into the CO selective oxidizing unit 34K.

The following describes a control operation carried out in the course of regulation of the inner temperature of the CO selective oxidizing unit 34K. FIG. 30 is a flowchart showing a routine of regulating the amount of the oxidizing gas, which is carried out during the course of regulation of the inner temperature of the CO selective oxidizing unit 34K.

When the fuel reformer 30 of the eleventh embodiment starts operation, the control unit 70 carries out the routine of regulating the amount of the oxidizing gas shown in the flowchart of FIG. 30 at predetermined time intervals, for example, at every 100 msec in this embodiment. The routine regulates the amount of the oxidizing gas introduced into the reformed gas to be suitable for the flow rate of the reformed gas fed to the CO selective oxidizing unit 34K.

When the program enters the routine, the CPU 72 first reads a flow rate of the reformed gas measured by the gas flow sensor 37 at step S600 and determines the amount of the oxidizing gas corresponding to the input gas flow at step S610. As mentioned above, the curve of the optimum amount of the oxidizing gas (that is, the minimum value that makes the concentration of carbon monoxide substantially equal to zero at the outlet of the CO selective oxidizing unit 34K) over the whole range of the flow rate of the reformed gas is stored in advance as a map in the ROM 74. The amount of the oxidizing gas corresponding to the input gas flow is accordingly read from the map.

At subsequent step S620, the CPU 72 calculates a required driving state of the blower 38 corresponding to the amount of the oxidizing gas specified at step S610. As discussed previously, the amount of the oxidizing gas introduced into the reformed gas depends upon the driving state of the blower 38. A concrete procedure of step S620 thus determines the required driving state of the blower 38 that makes the amount of the oxidizing gas introduced into the reformed gas equal to the amount of the oxidizing gas specified at step S610. The program then proceeds to step S630 to calculate a difference between the actual driving state of the blower 38 and the required driving state of the blower 38 obtained at step S620. The CPU 72 then calculates a driving amount of the blower 38 required for changing the driving state of the blower 38 by the calculated difference at step S640. At subsequent step S650, the CPU 72 outputs a driving signal, which represents the driving amount calculated at step S640, to the blower 38. The program then exits from this routine. The actuation of the blower 38 in this manner makes the amount of the oxidizing gas introduced into the reformed gas equal to the amount of the oxidizing gas specified at step S610. In this embodiment, the amount of the oxidizing gas is determined only according to the flow rate of the reformed gas. In case that a significant variation in concentration of carbon monoxide in the reformed gas is expected, it is preferable that the amount of the oxidizing gas is determined by taking into account not only the flow rate of the reformed gas but the concentration of carbon monoxide in the reformed gas.

In the fuel-cells system 10K of the eleventh embodiment, the oxidation reaction effectively consumes carbon monoxide produced by the reverse shift reaction proceeding in the CO selective oxidizing unit 34K, thereby significantly reducing the concentration of carbon monoxide in the reformed gas. The catalyst packed in the CO selective oxidizing unit 34K accelerates selective oxidation of carbon monoxide produced by the reverse shift reaction as well as carbon monoxide originally included in the reformed gas. Introduction of the suitable amount of the oxidizing gas into the reformed gas thus effectively decreases the concentration of carbon monoxide in the reformed gas.

The CO selective oxidizing unit 34K of the eleventh embodiment has only one reaction chamber 94 as shown in FIG. 29. Like the first through the fifth embodiments discussed above, the CO selective oxidizing unit 34K may have a plurality of reaction chambers. The amount of the catalyst is regulated according to the flow rate of the reformed gas (and the concentration of carbon monoxide in the reformed gas, if necessary), in order to enable the selected condition to approach the optimum condition. In case that carbon monoxide is produced by the reverse shift reaction under the selected condition, the amount of the oxidizing gas is further regulated to consume carbon monoxide by the selective oxidation reaction and significantly reduce the concentration of carbon monoxide in the reformed gas.

Some of the control operations for reducing the concentration of carbon monoxide carried out in the first through the eleventh embodiments may be combined for effective reduction of the concentration of carbon monoxide in the reformed gas. Namely some among the regulation of the amount of the catalyst, the catalyst temperature control, the methanization reaction, and the regulation of the amount of the oxidizing gas may be combined according to the requirements. The parameter (for example, the amount of the catalyst or the temperature of the catalyst) to be regulated according to the flow rate of the reformed gas and the concentration of carbon monoxide in the reformed gas for the purpose of reducing the concentration of carbon monoxide may be selected by taking into account the response of each control procedure (the time delay between the control and the actual effect) and the degree of adverse effects, such as a decrease in hydrogen partial pressure, caused by the control.

The present invention is not restricted to the above embodiments or their modified examples, but there may be many other modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. An apparatus for reducing concentration of carbon monoxide included in a carbon monoxide-containing hydrogen-rich gas, said apparatus comprising:

a carbon monoxide selective oxidation reaction unit including a predetermined amount of a carbon monoxide selective oxidizing catalyst for accelerating a selective oxidation reaction of carbon monoxide;

oxidizing gas introduction means for introducing an oxidizing gas containing oxygen for oxidizing carbon monoxide, into said carbon monoxide selective oxidation reaction unit;

gas supply means for feeding the hydrogen-rich gas containing carbon monoxide into said carbon monoxide selective oxidation reaction unit;

a carbon monoxide concentration sensor for measuring the concentration of carbon monoxide included in the hydrogen-rich gas fed to said carbon monoxide selective oxidation reaction unit; and catalyst amount control means for regulating an amount of the carbon monoxide selective oxidizing catalyst actually involved in the selective oxidation reaction of carbon monoxide out of a total amount of the carbon monoxide selective oxidizing catalyst, based on a quantity of carbon monoxide in the hydrogen-rich gas that is determined by taking into account at least a result of the measurement by said carbon monoxide concentration sensor.

2. An apparatus in accordance with claim 1, wherein said carbon monoxide selective oxidation reaction unit comprises a plurality of carbon monoxide selective oxidizing units that respectively include said carbon monoxide selective oxidizing catalyst and have an inlet, into which the hydrogen-rich gas mixed with the oxidizing gas flows, and an outlet, from which the hydrogen-rich gas containing a reduced concentration of carbon monoxide is discharged, said catalyst amount control means controlling an open/close state of at least either one of said inlet and said outlet of each said carbon monoxide selective oxidizing unit, so as to enable said selective oxidation reaction of carbon monoxide to proceed in a predetermined number of said carbon monoxide selective oxidizing units corresponding to the amount of carbon monoxide included in the hydrogen-rich gas.

3. An apparatus in accordance with claim 1, wherein said carbon monoxide selective oxidation reaction unit comprises a plurality of gas discharge openings arranged in a flow direction of the hydrogen-rich gas for discharging the hydrogen-rich gas containing a reduced concentration of carbon monoxide, said catalyst amount control means selecting one gas discharge opening, from which the hydrogen-rich gas containing the reduced concentration of carbon monoxide is actually discharged, among said plurality of gas discharge openings, so as to vary an area of said carbon monoxide selective oxidizing catalyst involved in said selective oxidation reaction of carbon monoxide in said carbon monoxide selective oxidation reaction unit.

4. The apparatus of claim 1, further comprising:

a methanization reaction unit including a methanization catalyst for accelerating a methanization reaction of carbon monoxide, said methanization reaction unit receiving a supply of the hydrogen rich gas containing a reduced concentration of carbon monoxide fed from said carbon monoxide selective oxidation reaction unit and further reducing the concentration of carbon monoxide in the hydrogen-rich gas through said methanization reaction.

5. An apparatus for reducing concentration of carbon monoxide included in a carbon monoxide-containing hydrogen-rich gas, said apparatus comprising:

a carbon monoxide reaction unit including a mixture of a carbon monoxide selective oxidizing catalyst that accelerates a selective oxidation reaction of carbon monoxide and a methanization catalyst that accelerates a methanization reaction of carbon monoxide, wherein the carbon monoxide selective oxidizing catalyst and methanization catalyst have been mixed with each other;

an oxidizing gas introduction conduit for introducing an oxidizing gas containing oxygen for oxidizing carbon monoxide, into said carbon monoxide reaction unit;

a gas supply conduit for feeding the hydrogen-rich gas containing carbon monoxide into said carbon monoxide reaction unit, wherein the selective oxidation reaction of carbon monoxide and the methanization reaction of carbon monoxide, which occur in said carbon monoxide reaction unit, reduce the concentration of carbon monoxide in the hydrogen-rich gas; and catalyst amount control means for regulating an amount of the carbon monoxide selective oxidizing catalyst actually involved in the selective oxidation reaction of carbon monoxide out of a total amount of the carbon monoxide selective oxidizing catalyst, based on quantity of carbon monoxide in the hydrogen-rich gas that is determined by taking into account at least a result of the measurement by a carbon monoxide concentration sensor.

6. An apparatus for reducing concentration of carbon monoxide included in a carbon monoxide-containing hydrogen-rich gas, said apparatus comprising:

a carbon monoxide selective oxidation reaction unit including a predetermined amount of a carbon monoxide selective oxidizing catalyst for accelerating a selective oxidation reaction of carbon monoxide;

oxidizing gas introduction means for introducing an oxidizing gas containing oxygen for oxidizing carbon monoxide, into said carbon monoxide selective oxidation reaction unit;

gas supply means for feeding the hydrogen-rich gas containing carbon monoxide into said carbon monoxide selective oxidation reaction unit;

carbon monoxide quantity measurement means for measuring a quantity of carbon monoxide included in the hydrogen-rich gas fed by said gas supply means;

catalyst amount determination means for determining a target amount of said carbon monoxide selective oxidizing catalyst that is to be actually involved in said selective oxidation reaction of carbon monoxide, based on a space velocity that depends upon a variation in quantity of carbon monoxide measured by said carbon monoxide quantity measurement means, so that the target amount of said carbon monoxide selective oxidizing catalyst thus determined causes an actual space velocity to approach the space velocity; and catalyst amount control means for regulating an amount of said carbon monoxide selective oxidizing catalyst actually involved in said selective oxidation reaction of carbon monoxide among a total amount of said carbon monoxide selective oxidizing catalyst, so that the amount of said carbon monoxide selective oxidizing catalyst approaches and becomes equal to the target amount of said carbon monoxide selective oxidizing catalyst determined by said catalyst amount determination means.

7. An apparatus for reducing concentration of carbon monoxide in accordance with claim 6, said apparatus further comprising:

oxidizing gas amount determination means for determining a target amount of the oxidizing gas to be introduced by said oxidizing gas introduction means, based on the quantity of carbon monoxide measured by said carbon monoxide quantity measurement means, such that a ratio of the quantity of carbon monoxide to a quantity of oxygen introduced into said carbon monoxide selective oxidation reaction unit is equal to a predetermined value, wherein said catalyst amount determination means determines the target amount of said carbon monoxide selective oxidizing catalyst by further taking into account the target amount of the oxidizing gas determined by said oxidizing gas amount determination means.

8. An apparatus for reducing concentration of carbon monoxide in accordance with claim 6, wherein said catalyst amount determination means comprises:

storage means in which a specific map is stored in advance, said specific map specifying a relationship between the quantity of carbon monoxide included in the hydrogen-rich gas and the target amount of said carbon monoxide selective oxidizing catalyst that is based on the space velocity, which is estimated according to the variation in quantity of carbon monoxide, said catalyst amount determination means determining the target amount of said carbon monoxide selective oxidizing catalyst by referring to said storage means, based on the quantity of carbon monoxide measured by said carbon monoxide quantity measurement means.

9. An apparatus in accordance with claim 6, wherein said carbon monoxide selective oxidation reaction unit comprises a plurality of carbon monoxide selective oxidizing units that respectively include said carbon monoxide selective oxidizing catalyst and have an inlet, into which the hydrogen-rich gas mixed with the oxidizing gas flows, and an outlet, from which the hydrogen-rich gas containing a reduced concentration of carbon monoxide is discharged, said catalyst amount control means controlling an open/close state of at least either one of said inlet and said outlet of each said carbon monoxide selective oxidizing unit, so as to enable said selective oxidation reaction of carbon monoxide to proceed in a predetermined number of said carbon monoxide selective oxidizing units corresponding to the amount of carbon monoxide included in the hydrogen-rich gas.

10. An apparatus in accordance with claim 6, wherein said carbon monoxide selective oxidation reaction unit comprises a plurality of gas discharge openings arranged in a flow direction of the hydrogen-rich gas for discharging the hydrogen-rich gas containing a reduced concentration of carbon monoxide, said catalyst amount control means selecting one gas discharge opening, from which the hydrogen-rich gas containing the reduced concentration of carbon monoxide is actually discharged, among said plurality of gas discharge openings, so as to vary an area of said carbon monoxide selective oxidizing catalyst involved in said selective oxidation reaction of carbon monoxide in said carbon monoxide selective oxidation reaction unit.

11. The apparatus of claim 6, further comprising:

a methanization reaction unit including a methanization catalyst for accelerating a methanization reaction of carbon monoxide, said methanization reaction unit receiving a supply of the hydrogen-rich gas containing a reduced concentration of carbon monoxide fed from said carbon monoxide selective oxidation reaction unit and further reducing the concentration of carbon monoxide in the hydrogen-rich gas through said methanization reaction.

12. An apparatus for reducing concentration of carbon monoxide included in a carbon monoxide-containing hydrogen-rich gas, said apparatus comprising:

a carbon monoxide selective oxidation reaction unit including a predetermined amount of a carbon monoxide selective oxidizing catalyst for accelerating a selective oxidation reaction of carbon monoxide;

oxidizing gas introduction means for introducing an oxidizing gas containing oxygen for oxidizing carbon monoxide, into said carbon monoxide selective oxidation reaction unit;

gas supply means having a single supply inlet, through which the hydrogen-rich gas containing carbon monoxide is fed into said carbon monoxide selective oxidation reaction unit; and catalyst amount control means for regulating an amount of said carbon monoxide selective oxidizing catalyst actually involved in said selective oxidation reaction of carbon monoxide among a total amount of said carbon monoxide selective oxidizing catalyst, based on a quantity of carbon monoxide included in the hydrogen-rich gas, wherein said carbon monoxide selective oxidation reaction unit comprises a plurality of gas discharge openings arranged in a flow direction of the hydrogen-rich gas fed through said single supply inlet to cause the hydrogen-rich gas containing a reduced concentration of carbon monoxide to be discharged outside, said plurality of gas discharge openings being positioned to have different flow path lengths of the gas from said single supply inlet, and wherein said catalyst amount control means selects one gas discharge opening, from which the hydrogen-rich gas containing the reduced concentration of carbon monoxide is actually discharged, among said plurality of gas discharge openings, so as to vary an area of said carbon monoxide selective oxidizing catalyst involved in said selective oxidation reaction of carbon monoxide in said carbon monoxide selective oxidation reaction unit.

* * * * *